(12) United States Patent
Ito et al.

(10) Patent No.: US 6,359,909 B1
(45) Date of Patent: Mar. 19, 2002

(54) SWITCH DEVICE FOR RELAYIN G CELLS OR PACKETS ON DEMAND

(75) Inventors: Jun Ito; Shigetaka Moriyama; Tomomi Ogawa, all of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/854,213

(22) Filed: May 9, 1997

(30) Foreign Application Priority Data

May 9, 1996 (JP) .............................................. 8-114872

(51) Int. Cl.[7] .............................................. H04L 12/56
(52) U.S. Cl. ........................ 370/522; 370/217; 370/389; 370/524; 370/469; 370/410
(58) Field of Search ................................. 370/217, 218, 370/219, 220, 395, 389, 522, 524, 469, 410; 714/1, 2, 3, 4

(56) References Cited

U.S. PATENT DOCUMENTS

| | | | |
|---|---|---|---|
| 5,469,493 A | | 11/1995 | Kenyoshi ........................ 379/9 |
| 5,490,141 A | * | 2/1996 | Lai et al. ...................... 370/352 |
| 5,524,010 A | * | 6/1996 | Boltjes ........................ 370/385 |
| 5,537,404 A | * | 7/1996 | Bentley et al. .............. 370/384 |

FOREIGN PATENT DOCUMENTS

| | | |
|---|---|---|
| JP | 62-219846 | 9/1987 |
| JP | 6-303317 | 10/1994 |

OTHER PUBLICATIONS

ITU–T Recommendation Q.2931 (Feb. 1995) B–ISDN Application Protocols For Access Signalling.

* cited by examiner

Primary Examiner—Seema S. Rao
Assistant Examiner—Saba Tsegaye
(74) Attorney, Agent, or Firm—Rosenman & Colin LLP

(57) ABSTRACT

There is provided a switch device in a communication system in which a relay service of a cell or packet is provided on demand. A layer-3 communication controller performs a signaling control of a call set-up/release requested by a user terminal in accordance with a layer-3 communication protocol. A layer-3 communication restart controller can be connected to the user terminal in accordance with the layer-3 communication protocol and is connected to controllers in the switch device via a given interface. The layer-3 communication restart controller requests a call release process for a call managed by the layer-3 communication controller in accordance with a restart request for a call from the user terminal, and requests a restart process to the user terminal in accordance with a call release process issued in the switch device.

21 Claims, 31 Drawing Sheets

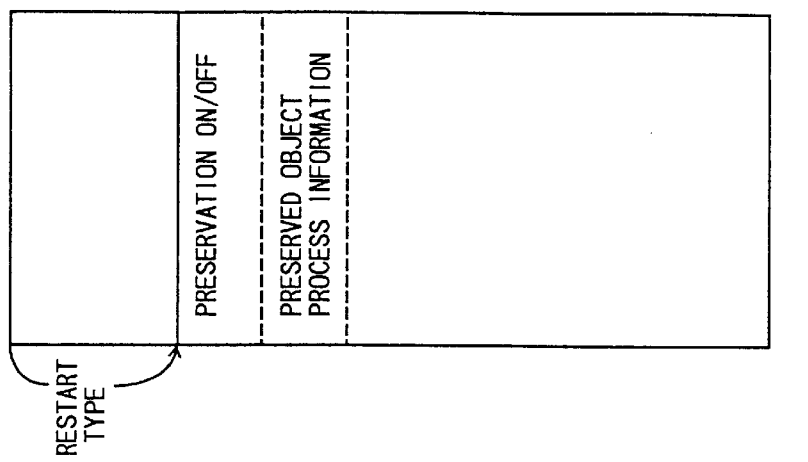
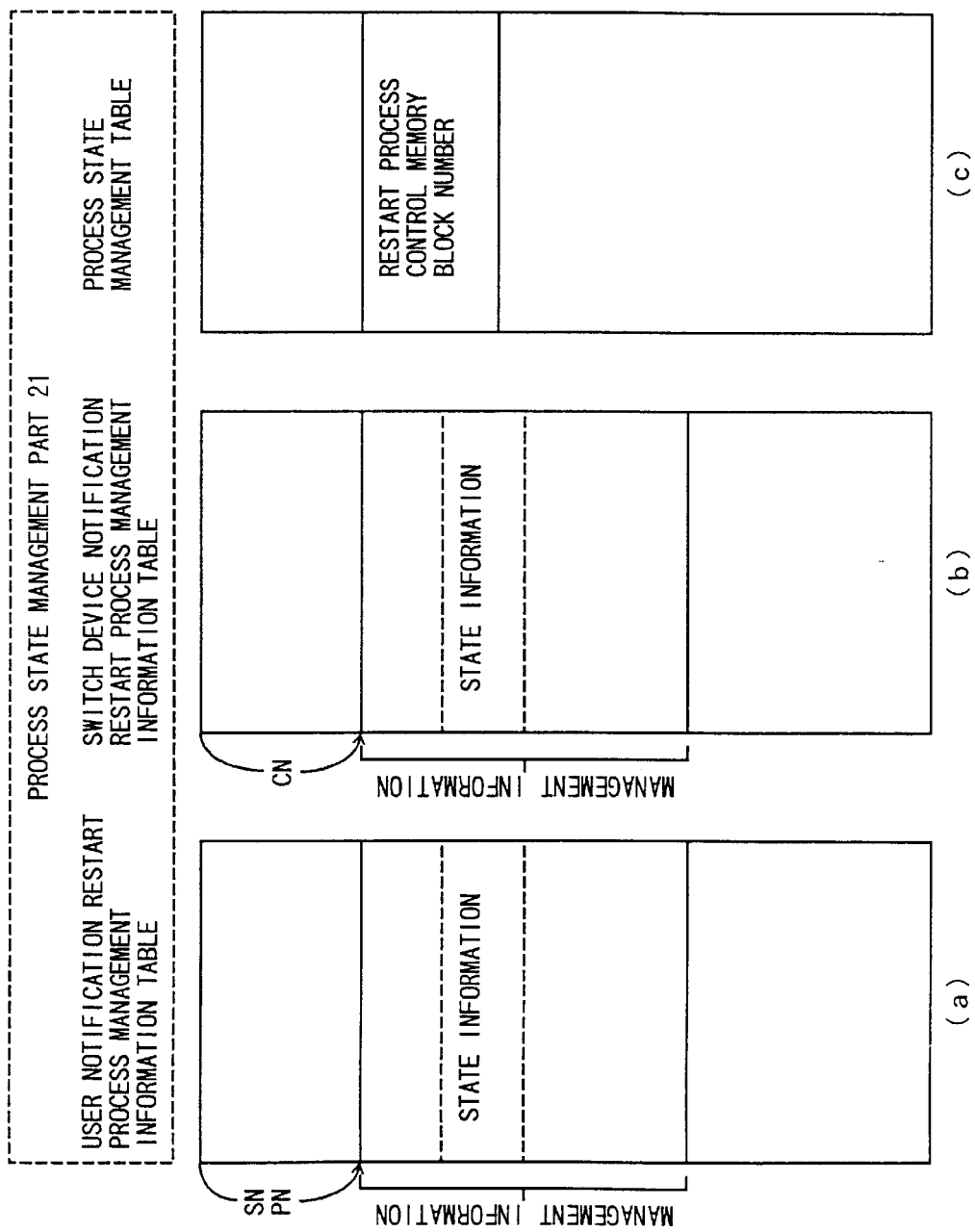

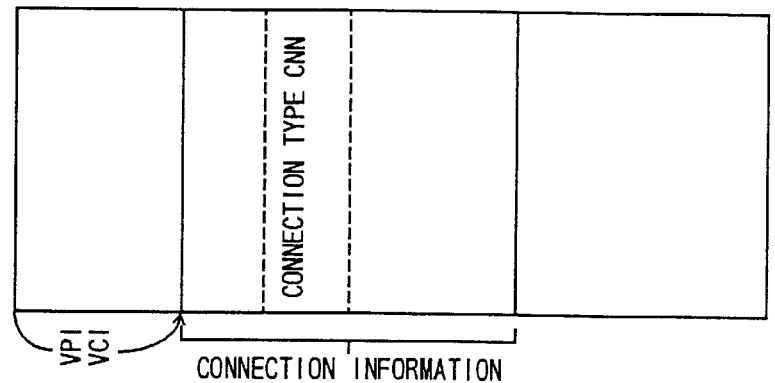
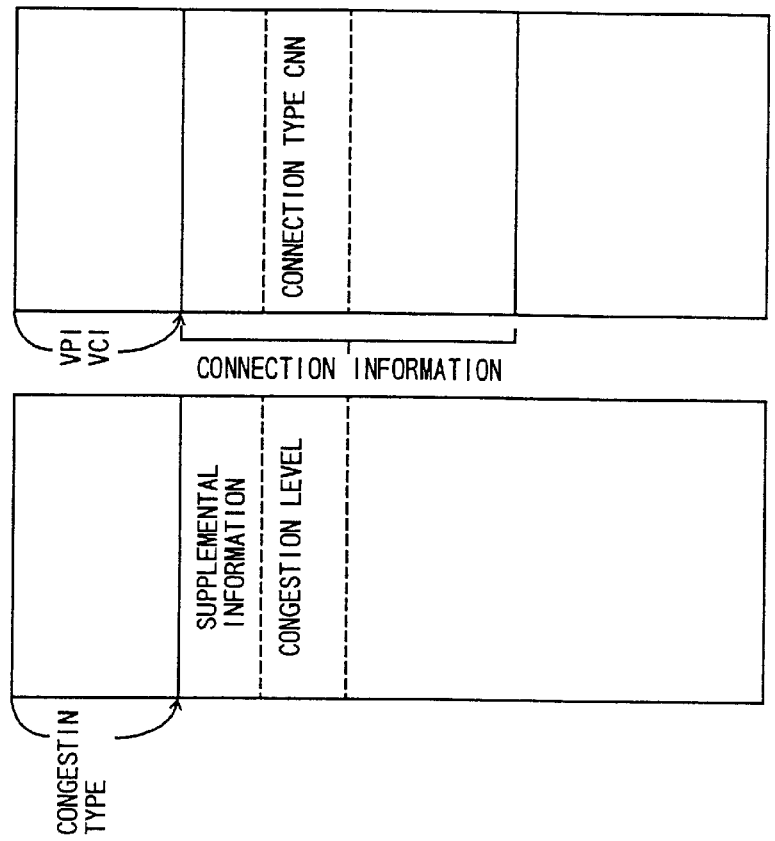
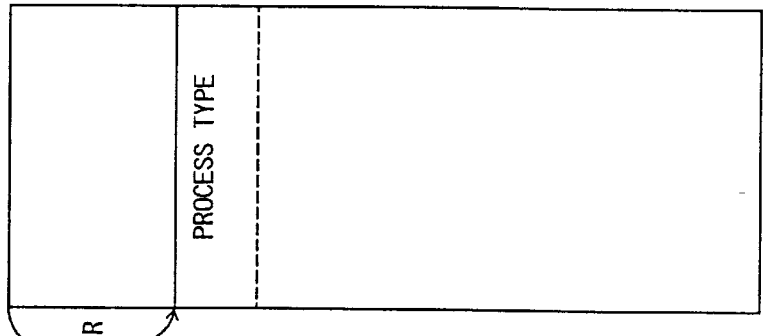
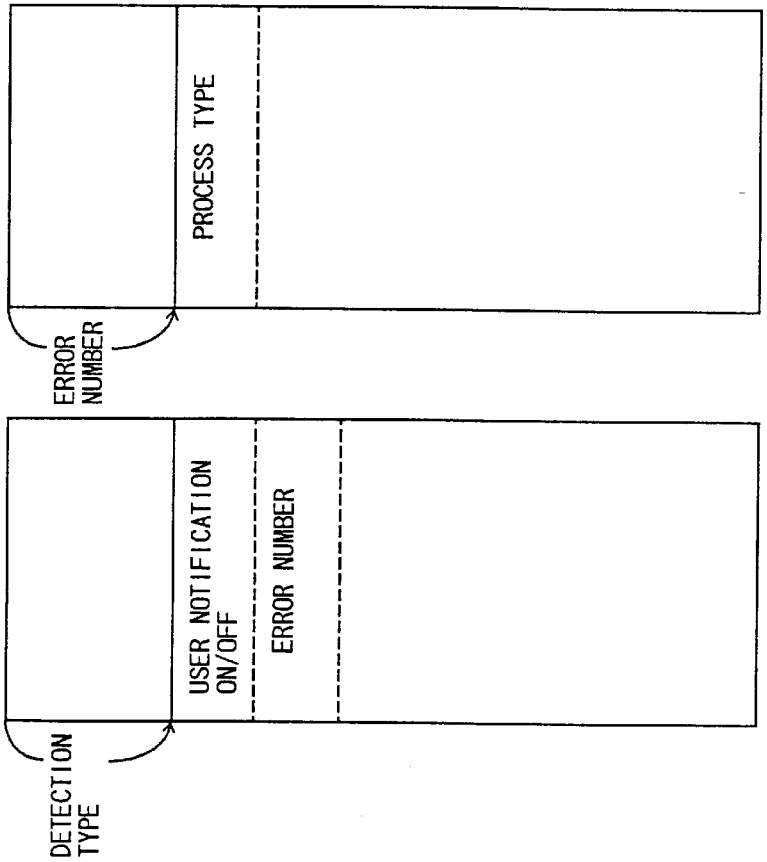

SWITCH DEVICE FOR RELAYIN G CELLS OR PACKETS ON DEMAND

BACKGROUND OF THE INVENTION

1. Field of the Invention

The present invention generally relates to switch devices, and more particularly to a switch device of a communication system which provides services of relaying cells or packets on demand.

A switch device of this type provides an on-demand cell relay service or a switched virtual call service (SVC service) which is an on-demand frame relay service.

In the SVC service, a call set-up/release process is carried out between a calling terminal and a called terminal by a pre-event/post-event signaling control according to a layer-3 communication protocol. In this case, there is no problem when the call set-up/release process is normally performed. If a fault occurs in a user terminal, a line (channel) or a switch device, the call process will no longer controlled and managed normally, and an incompatibility of the state of the call will occur between the user terminal and the switch device. It is thus desired that a switch device be provided which can easily release the incompatibility of the call state.

2. Description of the Related Art

FIG. 1 is a block diagram of a conventional ATM (Asynchronous Transfer Mode) switch system, which includes user terminals 1a and 1b, line (channel) termination equipments 2a and 2b, an ATM switch (ATMSW) 3, a signaling controller 4 which terminates a signaling link, and a main controller 5. An ATM switch device includes the line termination devices 2a and 2b, the signaling controller 4 and the main controller 5.

The user terminals 1a and 1b and the ATM switch device are coupled together via physical links, via which logical data paths are set and released between the user terminals 1a and 1b and the ATM switch device. The setting and releasing of the data paths are carried out by a signaling control using the signaling links. The signaling control is realized by providing the ATM switch device and the user terminals 1a and 1b with a layer-3 communication control function which conforms with respective specific layer-3 communication protocols.

The main controller 5 includes a processor part CC, and a main memory part MM. The processor part CC has a main function of realizing various communication services. The main memory part MM stores various pieces of data for controlling. The processor part CC includes a layer-3 communication controller 6. The main memory part MM includes a connection management table, a subscriber (user) data table, a line termination equipment information (identification number) table, and a call process management table.

The subscriber data table includes, for each subscriber, the telephone number and information concerning various communication services. The line termination equipment information table includes translation information used to obtain a number of the related line termination equipment 2 from a number SN of the signaling controller 4 and a port number PN of the corresponding signaling link. The translation information is generated by a command when a user terminal request the SVC service, and is stored in the line termination equipment information table. Further, the translation information is sent to the signaling controller 4 when it is generated, and is stored in a memory (not shown) therein.

When the SVC service is presented, the information concerning the connection used as a signaling link is presented in the same manner as the translation information, and the connection for the signaling link is supplied between the user terminal and the ATM switch device. The connection information for the signaling link is managed by specific data so that it can be searched for by the signaling controller number SN and the part number PN.

The information concerning a connection (data path) used in the SVC service is managed, for each service application, using the connection management table of the layer-3 communication controller 6. The service application includes a permanent virtual circuit (PVC) and a switched virtual call (SVC). When an inquiry request for the connection information is generated within the ATM switch device or from the outside thereof, the request source can be notified of the connection information VPI/VCI for each service application PVC/SVC. The above connection management process can inform the service application PVC/SVC by receiving the connection information VPI/VCI.

With the above structure, when a data path is set between the user terminals on demand, the signaling controller 4 of the ATM switch device receives information concerning a signaling related to the SVC service and sent by the user terminal. The received information is modified so that the signaling controller number SN and the port number PN which terminates the signaling link are added thereto, and is sent to the layer-3 communication controller 6.

The layer-3 communication controller 6 searches the line termination equipment table by referring to the signaling controller number SN and the part number PN, and obtains the corresponding line termination equipment number CN presented to the subscribers, and refers to the subscriber data table by using the obtained line termination equipment number CN. Then, the controller 6 obtains subscriber data of the subscriber accommodated in the ATM switch device, and controls the SVC service according to the subscriber information in the subscriber data.

However, the above conventional scheme has the following disadvantages. There is a possibility that a fault may occur in the ATM switch device while the service is provided. Examples of such a fault are faults occurring the line, the signaling link, the signaling controller 4, the ATM switch, the processor part CC/main memory part MM (which may require a restart of the ATM switch), and a controller which specifically deals with the protocol such as the layer-3 communication controller. If a fault as described above occurs, a communication between the ATM switch device and the user terminal will be interrupted. Even if the fault is removed and the system restarts, the control of the correct SVC service will not be ensured. If a fault which does not ensure the restarting or the call process in a defective device occurs in the ATM switch device, the ATM switch device releases the relating call by itself. However, there is no method to ensure that the user terminal will be correctly notified of the call releasing procedure carried out in response to the occurrence of a fault. Hence, there is a possibility that an incompatibility may occur between the call process in the ATM switch device and the call process in the user terminal. Such a situation may occur if a fault occurs in the user terminals.

SUMMARY OF THE INVENTION

It is a general object of the present invention to eliminate the above disadvantages.

A more specific object of the present invention is to provide a switch device which efficiently eliminate an incompatibility regarding the call process which occurs between the user terminals and the switch device.

The above objects of the present invention are achieved by a switch device in a communication system in which a relay service of a cell or packet is provided on demand, the switch device comprising: a layer-3 communication controller which performs a signaling control of a call set-up/release requested by a user terminal in accordance with a layer-3 communication protocol; and a layer-3 communication restart controller which can be connected to the user terminal in accordance with the layer-3 communication protocol and is connected to controllers in the switch device via a given interface. The layer-3 communication restart controller perform a call release process for a call managed by the layer-3 communication controller in accordance with a restart request for a call from the user terminal, and requests a call restart process to the user terminal in accordance with a call release process issued in the switch device.

The switch device may be configured so that: the layer-3 communication restart controller includes a compatibility controller interposed between the user terminal and the switch device; and when the compatibility controller receives, from the user terminal, a response to the restart request from the layer-3 communication restart controller, the compatibility controller determines whether a content of the response coincides with a content of the restart request issued by the layer-3 communication restart controller, and accepts the restart request if a determination result is affirmative.

The switch device may be configured so that: the layer-3 communication restart controller includes a compatibility controller interposed between the user terminal and the switch device; and when the compatibility controller receives the restart request from the user terminal, the compatibility controller determines whether the restart request includes necessary information or whether information contained in the restart request is acceptable in the layer-3 communication restart controller; and the compatibility controller accepts the restart request if a determination result if affirmative.

The switch device may be configured so that: the layer-3 communication restart controller includes a connection analysis controller interposed between the user terminal and the switch device; when the connection analysis controller receives the restart request from the user terminal, the connection analysis controller determines whether information concerning a connection included in the restart request indicates an intolerable connection, and accept the restart request if a determination result is negative.

The switch device may be configured so that the connection analysis controller selectively makes a first decision to a permanent virtual circuit, a second decision to a signaling link, and/or a third decision to the permanent virtual circuit and the signaling link.

The switch device may be configured so that: the layer-3 communication restart controller includes a protection controller interposed between the user terminal and the switch device, and a process state management controller which holds user notification restart process management information used to manage the restart process executed by the switch device and directed to the user terminal in response to the restart request from the user terminal; and when the protection controller receives the restart request from the user terminal, the protection controller determines whether the restart process is being executed in response to another restart request from the user terminal by searching the user notification restart process management information in the process state management part, and accepts the restart request if a determination result is negative.

The switch device may be configured so that: the layer-3 communication restart controller includes a protection controller interposed between the user terminal and the switch device, and a process state management part which holds user notification restart process management information used to manage the restart process executed by the switch device and directed to the user terminal in response to the restart request from the user terminal; and when the protection controller receives the restart request from one of the controllers in the switch device, the protection controller determines whether the user terminal is executing the restart process by searching the switch device notification restart management information in the process state management part, and accepts the restart process if a determination result is negative.

The switch device may be configured so that, when a counter determination result is obtained, the response or the restart request is discarded and the user terminal is notified that the response or the restart request is discarded and that the response or the restart request has a departure (error).

The switch device may be configured so that, when the determination result is affirmative, the protection controller discards the restart request, holds and executes all restart requests in a requesting order, or executes a restart request which is held for the last time after the restart process being executed is completed.

The switch device may be configured so that an operation of the protection controller to be executed when the determination result is affirmative can be selected by the user terminal.

The switch device may be configured so that: the layer-3 communication controller includes a layer-3 restriction controller which is connected to the layer-3 communication restart controller and restricts a call process operation of the layer-3 communication controller on the basis of a restart process state of the layer-3 communication restart controller; and the layer-3 restriction controller restricts a layer-3 communication sequence which is executed by the layer-3 communication controller and is directed to the user terminal which is executing the restart process in response to the restart process of the layer-3 communication restart controller.

The switch device may be configured so that: the layer-3 communication controller includes a call restriction controller which is connected to the layer-3 communication restart controller and restricts a call process operation of the layer-3 communication controller on the basis of a restart process state of the layer-3 communication restart controller; and when the layer-3 communication controller receives a call set-up request from the user terminal and a connection captured by the layer-3 communication controller is a connection which is subjected to the restart process by the layer-3 communication restart controller, the call restriction controller restricts the call set-up request.

The switch device may be configured so that: the layer-3 communication restart controller includes a selection controller which holds information concerning a control type given by the user terminal beforehand, the control type including a network-initiative control, a user-initiative control and a two-way control; and when the layer-3 communication restart controller receives the restart request from the user terminal or one of the controllers in the switch device, the layer-3 communication restart controller determines whether the restart process should be executed in accordance with the information concerning the control type held in the selection controller.

The switch device may be configured so that, when the restart request from the user terminal is received, the selection controller determines whether the restart request is inconsistent with the control type given by the user terminal, and notifies, if a determination result is affirmative, the user terminal of an inconsistency of the restart request.

The switch device may be configured so that: the layer-3 communication restart controller includes a preservation controller connected to a system management control part which manages the controllers in the switch device, and a control memory management part which holds process state management information for managing a state transition of the restart process in the layer-3 communication restart controller; and when the preservation controller receives a notification of a restart from the system management control part, the preservation controller extracts a call which is subjected to the restart process by the layer-3 communication restart controller by searching the process state management information of the control memory management part, and executes the restart process for the call if ensuring the restart process is requested.

The switch device may be configured so that the layer-3 communication restart controller includes: a preservation controller connected to a system management control part which manages the controllers in the switch system; a control memory management part which holds process state management information for managing a state transition of the restart process in the layer-3 communication restart controller; and a process state management part which holds user notification restart process management information used to manage the restart process executed by the switch device and directed to the user terminal in response to the restart request from the user terminal, and wherein: when the preservation controller receives a notification of a restart from the system management controller, the preservation controller extracts a call which is subjected to the restart process by the layer-3 communication restart controller by searching the process state management information of the control memory management part on the basis of the restart process management information of the process state management part, and executes the restart process for the call if ensuring the restart process is requested.

The switch device may be configured so that ensuring the restart process is selectable beforehand in accordance with the type of the restart.

The switch device may be configured so that: the layer-3 communication restart controller includes an enquiry controller interposed between a lower layer controller and the switch device; and if the enquiry controller detects a link reset/interlink fault in a signaling link, or if the enquiry controller receives a notification of a fault relating to the lower layer, the enquiry controller obtains a call process state of a call which encounters a fault from a call process management table managed by the layer-3 communication controller, and enquries of user terminal a state of the call which encounters the fault via the layer-3 communication controller in order to confirm whether the layer-3 communication sequence is normally executed by the layer-3 communication controller.

The switch device may be configured so that: the layer-3 communication restart controller includes an enquiry controller interposed between a lower layer controller and the switch device; and if the enquiry controller detects a link reset/interlink fault in a signaling link, or if the enquiry controller receives a notification of a fault relating to the lower layer, the enquiry controller obtains a call process state of a call which encounters a fault from a call process management table managed by the layer-3 communication controller, and enquries, by itself, of the user terminal a state of the call which encounters the fault in order to confirm whether the layer-3 communication sequence is normally executed by the layer-3 communication controller.

The switch device may be configured so that: the layer-3 communication restart controller includes an announcement controller interposed between a lower layer controller and the switch device; and when the layer-3 communication restart controller receives the restart request from the user terminal and detects a situation in which a resource necessary for the restart control cannot be obtained or a process inconsistency occurs in the layer-3 communication restart controller, so that the restart process cannot continue, the announcement controller notifies the user terminal which issues the restart request that the restart process is stopped.

The switch device may be configured so that: the layer-3 communication restart controller includes a restart control sequence control interface controller which provides a layer-3 communication restart control sequence interface with the user terminal, and a reject controller connected to the restart control sequence control interface controller; when the restart control sequence control interface controller receives the restart request from the user terminal, the restart control sequence control interface controller checks a format of the received restart request, and provides the reject controller with an analysis result and necessary received information; and the reject controller discards the restart request in response to receipt of the analyses result and the necessary received information, and edits given notification information based thereon, the given notification information being sent to the user terminal.

The switch device may be configured so that: the layer-3 communication restart controller includes a notification controller interposed between the layer-3 communication restart controller and an upper-layer controller or the layer-3 communication controller; the notification controller is activated when there is no response from the user terminal in response to the restart request from the layer-3 communication restart controller, and edits abnormality control on the basis of abnormality information concerning a line, a logical path or a logical connection via which no response is received; and the notification controller notifies a maintenance person of the abnormality information, or notifies the layer-3 communication controller of the abnormality information in order to urge a restriction of the call process to the user terminal.

The switch device may be configured so that a range of the restriction of the call process by the layer-3 communication controller is selectable beforehand by the user terminal.

The switch device may be configured so that the layer-3 communication controller releases the restriction of the call process when the user terminal which restricts the call process activates the layer-3 communication controller.

The switch device may be configured so that the connection which is subject to the call process is recovered when the user terminal specifies the above connection and activates the layer-3 communication controller.

The switch device may be configured so that: the layer-3 communication restart controller includes an overload controller connected to a system management control part which manages the controllers of the switch device; when the overload controller receives, from the system management controller, a notification of a congestion which occurs in the switch device, the overload controller analyzes a content of the notification and manages an analyzed result for each congestion type; and the overload controller provides congestion management information in response to an enquiry from the layer-3 communication restart controller.

The switch device may be configures so that: the layer-3 communication restart controller includes an upper-layer interface controller connected to an upper-layer controller; and the layer-3 communication restart controller executes the restart process in a switch initiative formation in response to a command that is input via the upper-layer interface controller.

The switch device may be configured so that: the layer-3 communication restart controller includes an upper-layer interface controller connected to the layer-3 communication controller; and when there is no release response from the user terminal by a call release request by the layer-3 communication controller, the layer-3 communication restart controller is informed that there is no release response and executes the restart process in a switch initiative formation.

The switch device may further comprise: administration controller that are respectively provided to the controllers of the switch device and supervise operating states of the controllers; and a main administration controller which totally manages the administration controllers, wherein the main administration controller collects supervisory information from the controllers and issue an indication when the supervisory information satisfies a given condition.

BRIEF DESCRIPTION OF THE DRAWINGS

Other objects, features and advantages of the present invention will become more apparent from the following detailed description when read in conjunction with the accompanying drawings, in which:

FIGS. 9A and 9B are diagram of tables used in the embodiment of the present invention;

FIGS. 10A, 10B, 10C and 10D are diagrams of tables used in the embodiment of the present invention;

DESCRIPTION OF THE PREFERRED EMBODIMENTS

Figure 1:
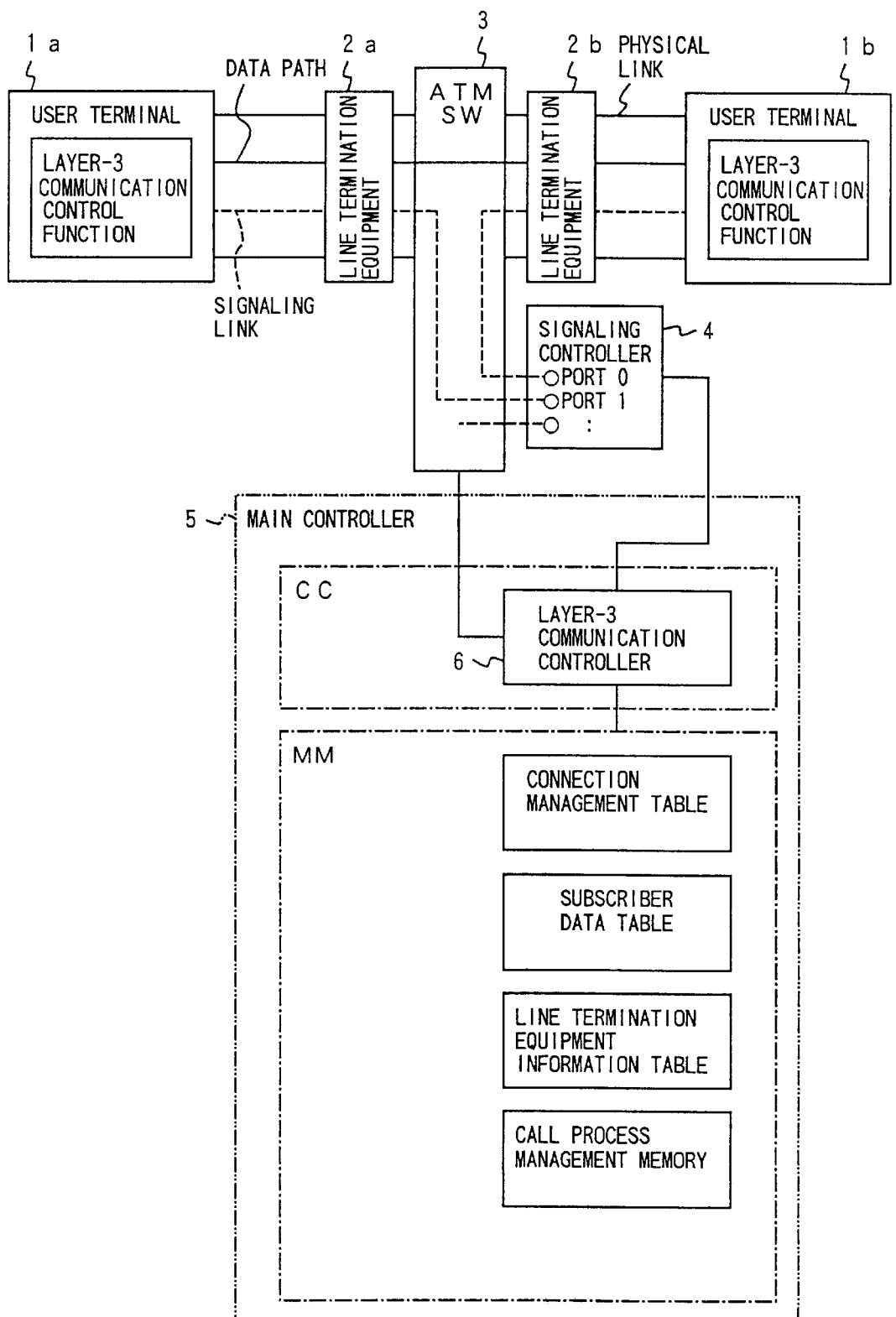
FIG. 1 is a block diagram of a conventional ATM switch system.
Figure 2:
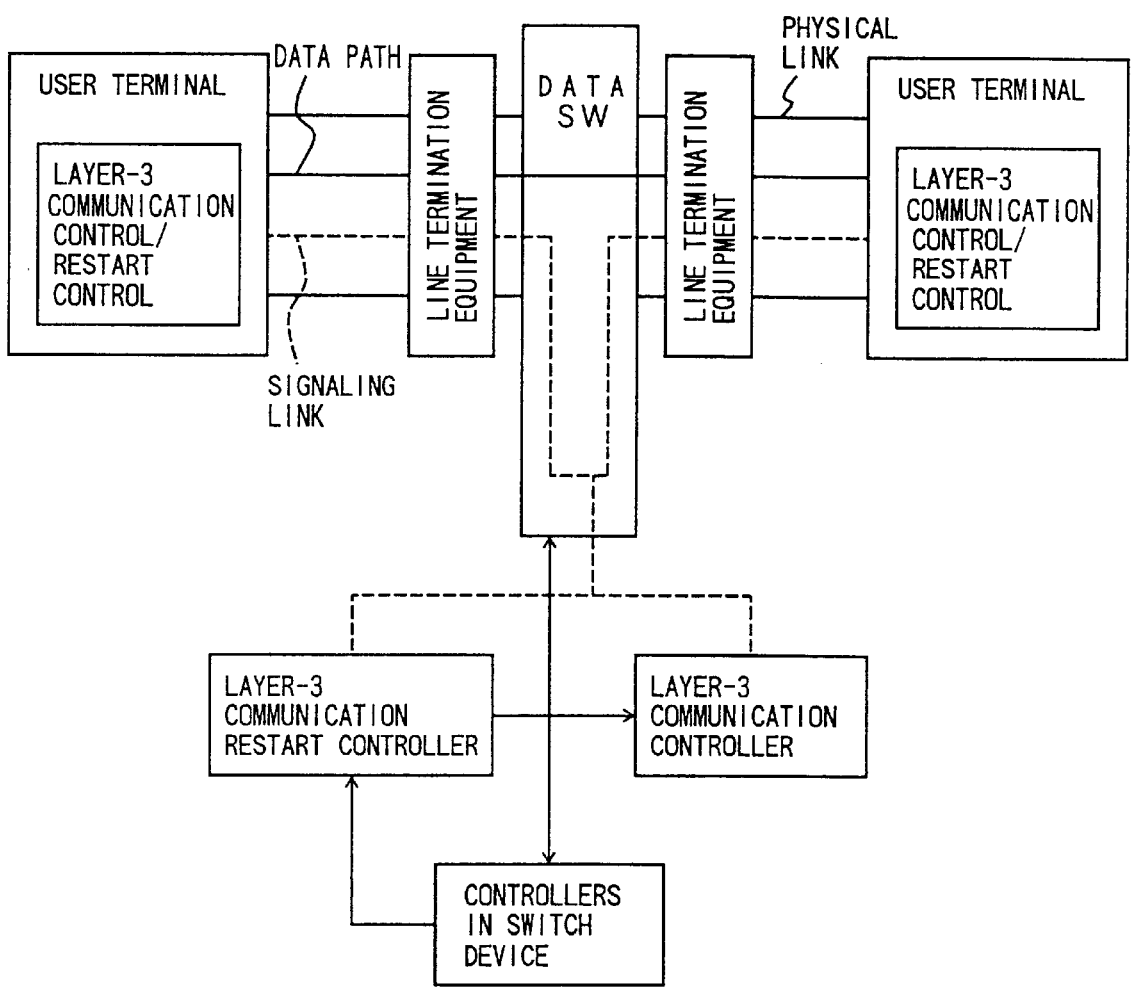
FIG. 2 is a block diagram of the principle of a switch device according to the present invention.

FIG. 2 shows the principle of the switch device of the present invention. The switch device of the present invention relates to a communication system which presents a relay service of cells or packets on demand. The present invention includes a layer-3 communication controller, which performs a signaling control of setting up and releasing a call requested by a user terminal according to the layer-3 communication protocol. Further, the present invention includes a layer-3 communication restart (initializing) controller, which makes a connection with a user terminal according to the layer-3 communication protocol and makes connections with controllers provided in the switch device via given interfaces. The layer-3 communication restart controller performs a control directed to releasing a call managed by the layer-3 communication controller in accordance with a call restart request from a user terminal. Further, the layer-3 communication restart controller requests the user terminal to restart in accordance with a call restarting request generated in the switch device.

In the prior art, if a user terminal is released from a defective state, the state of the call in the user terminal is initialized and may be incompatible (inconsistent) with the call state in the switch device. On the other hand, according to the present invention, the layer-3 communication restart controller urges the call releasing process managed by the layer-3 communication controller in accordance with a call restarting request from the user terminal. Hence, the incompatibility regarding the call state can be avoided.

In the prior art, when a fault is eliminated from the switch device which is then restarted, part or all of the states of calls in the switch device are released (initialized) by itself, and an incompatibility will occur between at least one user terminal and the switch device. On the other hand, according to the present invention, the layer-3 communication restart controller requests the corresponding user terminal to restart in accordance with a call restart request generated in the switch device. Hences, the above incompatbility can easily be avoided.

A description will now be given, with reference to FIGS. 3 through 31, of an embodiment of the present invention, in which parts that are the same as those in the above-mentioned figures are given the same reference numbers.

Figure 3:
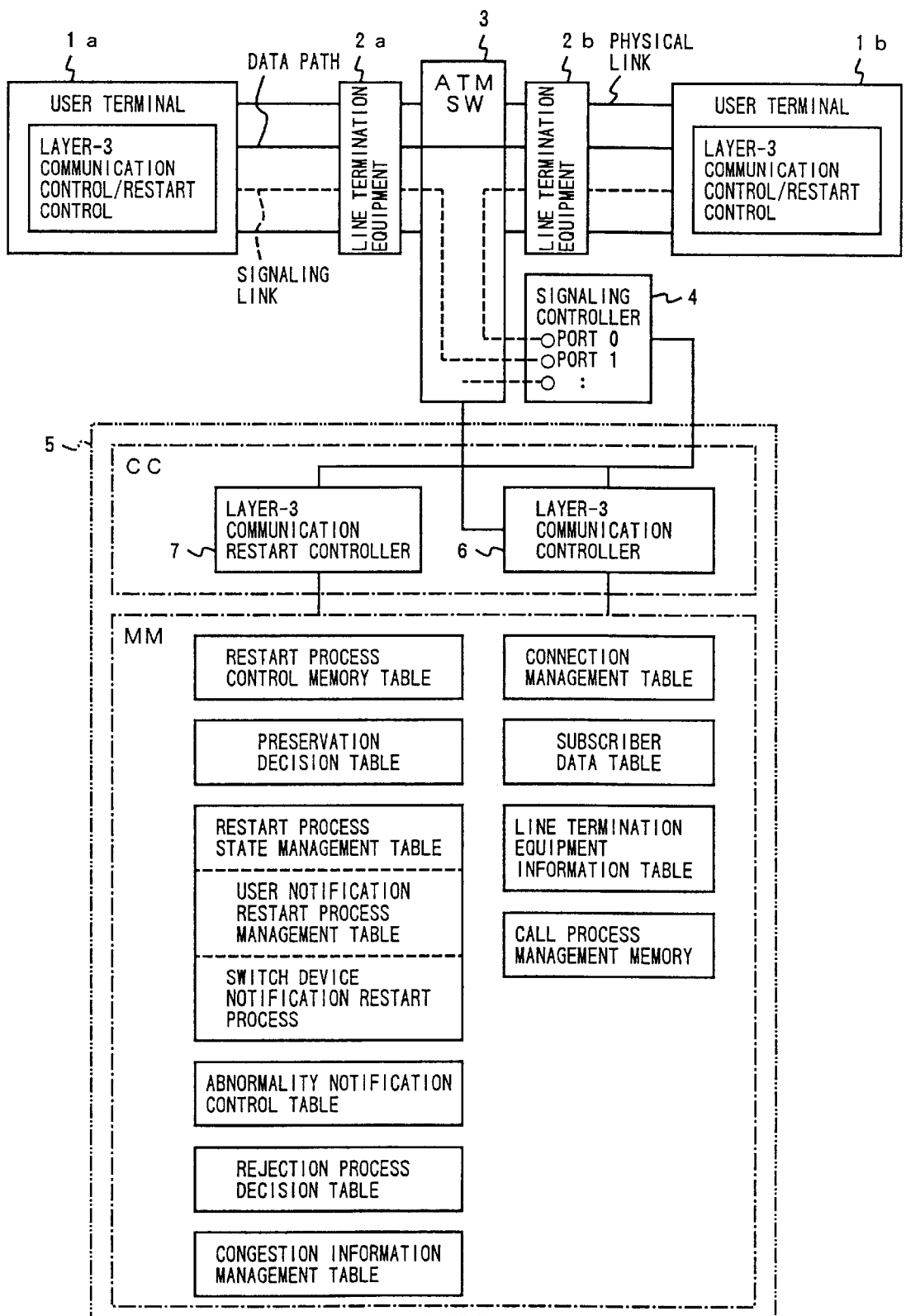
FIG. 3 is a block diagram of an ATM switch system according to an embodiment of the present invention.

FIG. 3 is a block diagram of an ATM switch system according to an embodiment of the present invention. The ATM switch system shown in FIG. 3 includes user terminals 1a and 1b, line termination equipments 2a and 2b, an ATM switch (ATMSW) 3, a signaling controller 4, a main controller 5, a processor CC, a main memory MM, a layer-3 communication controller 6, which performs a call set-up/release process, and a layer-3 communication restart controller which performs a call restart process.

Each of the user terminals 1a and 1b has, in addition to the conventional layer-3 communication control function, a layer-3 communication restart function which interfaces with the layer-3 communication restart controller 7 of the ATM switch device. A user terminal which is not equipped with the layer-3 communication restart control function can be connected to the ATM switch device. The layer-3 communication restart controller 7 is provided in the same upper layer (layer 3) as the layer-3 communication controller 6. That is, the controllers 6 and 7 are positioned in the layer higher than the low layers, namely, the physical layer, the ATM layer and the adaptation layer. The main memory MM is provided with various tables used in the layer-3 communication restart control.

Figure 4:
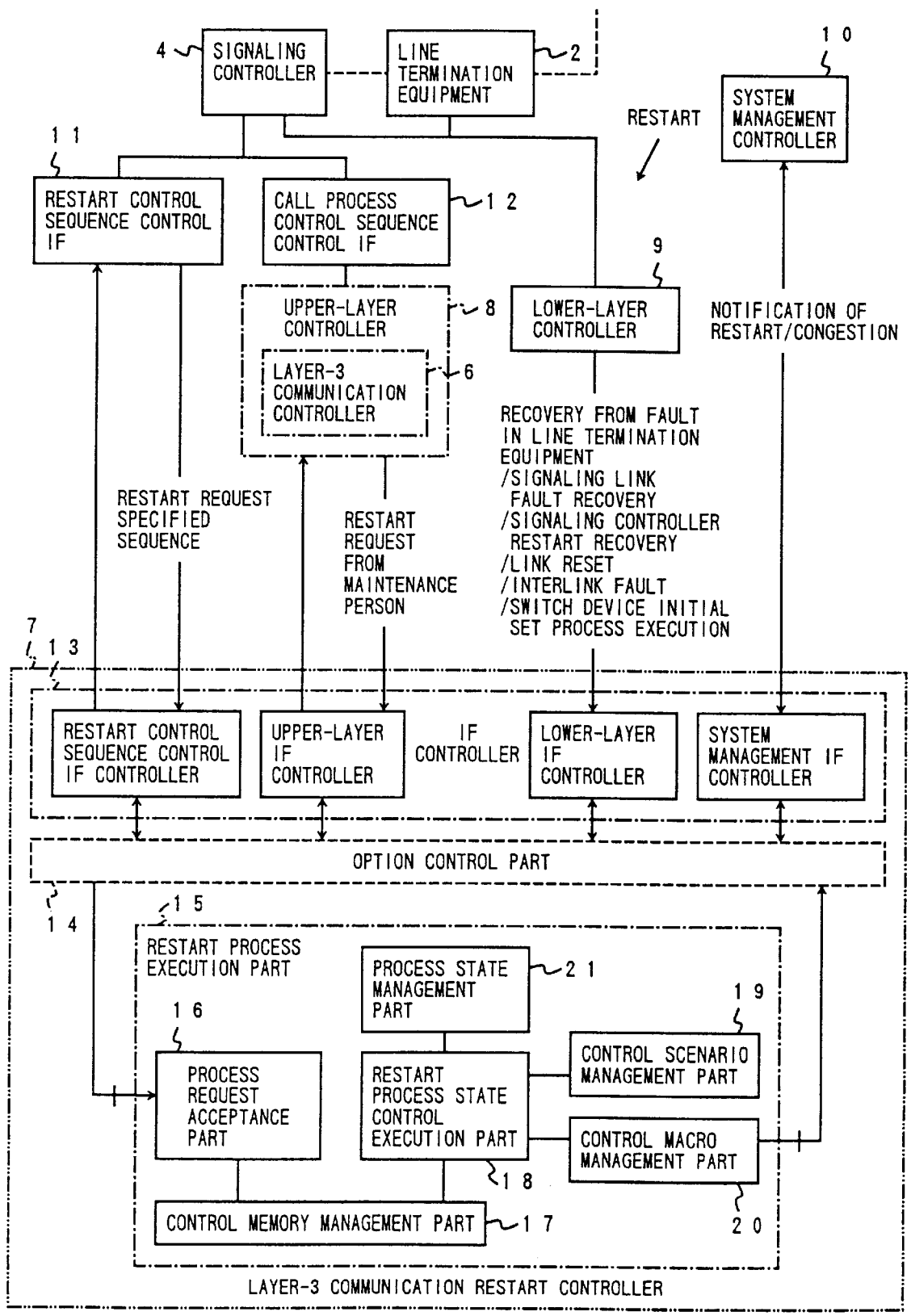
FIG. 4 is a block diagram of an ATM switch device according to the embodiment of the present invention.

FIG. 4 is a block diagram of an ATM switch device used in the ATM system shown in FIG. 3. The ATM switch device includes an upper-layer controller 8 which controls upper layers, a lower-layer controller 9 which controls lower layers, a system management controller 10 which manges the ATM system, a restart control sequence interface 11, and a call process controller sequence interface 12.

The interfaces 11 and 12 are connected to the signaling controller 4. The interface 11 establishes an interface relating to the sequence of the restart process between the signaling controller 4 and the layer-3 communication restart controller 7. The interface 12 establishes an interface relating to the sequence of the call process between the signaling controller 4 and the layer-3 communication controller 6, as in the case of the prior art. Although not shown, the upper and lower layer controllers 8 and 9 include respective controllers which control the layer-3 communication restart controller 7.

The layer-3 communication restart controller 7 includes an interface controller 13, an option control part 14, and a restart process execution part 15. The interface controller 13 provides an interface with the controllers. The option control part 14 realizes various optional functions, which will be described layer. The restart process execution part 15 performs the layer-3 communication restart control. The basic functions of the layer-3 communication restart controller 7 are realized by the interface controller 13 and the restart process execution part 15.

The interface controller 13 is equipped with a restart control sequence control interface controller, a lower-layer interface controller, an upper-layer interface controller, and a system management interface controller.

The restart control sequence control interface controller accepts a specific sequence (procedure) of the restart request from the user terminal, and checks a format of a message used in the sequence. Then, the above controller generates internal information concerning the message format. In this case, if a message format other than that determined between the user terminal and the switch device is used, received information is immediately discarded. If a departure from specified information or sequence concerning the message format occurs, the content of the departure is edited and sent to the internal process. If a specific sequence is requested to the user terminal, information from the internal process is edited in the message format used in the sequence, and is sent to an external part.

The upper-layer interface controller accepts a request from the layer-3 communication controller 6, and a request from a maintenance person via the upper-layer controller 8 (request for execution of the restart sequence by a command).

The lower-layer interface controller receives a notification for the lower-layer controller 9 when a defective portion is recovered, and performs a translation process for the lower-layer control information and the restart process information. For example, the lower-layer interface controller performs the above process when recovering from 1) a fault in the line terminal equipment 2 which provides the SVC service between the user terminal and the switch device, 2) a fault in the specific signaling link for transferring control information between the user and the switch device, 3) a fault in a link reset or an interlink fault from the signaling controller 4 or a fault in the signaling controller 4 itself, or 4) when an initial setting process of the switch device itself is performed.

The system management interface controller accepts a notification indicative of a system restart or congestion from the system management controller 10.

The option control part 14 will be described later.

The restart process execution part 15 includes a process request acceptance part 16, a control memory managemet part 17, a restart process state control execution part 18, a control scenario management part 19, a control macro management part 20 and a process state management part 21.

The process request acceptance part 16 accepts various process requests from the interface controller 13. The control memory management part 17 holds a so-called state transition rule necessary to execute the restart process, and reads the necessary state transition rule based on the content of the request accepted by the process request acceptance part 16. The restart process state control execution part 18 determines the control information in the control memory 17 and elects the process sequence corresponding to the state at that time and the input condition from the control scenario mangement part 19. In this manner, the execution part 18 proceeds with the restart process. The control macro management part 20 provides a process macro described in the scenario. With the above structural components, the layer-3 restart control (the request for the restart process to the user terminal by the switch device, and the request for the restart process to the layer-3 communication controller based on the request by the user terminal) are carried out. The process state management part 21 manages information indicating switch user terminal issues the restart process which is currently executed by the layer-3 communication controller 6, and manages information indicating to which user terminal the restart process is currently executed in response to the restart request from the switch device.

Figure 5:
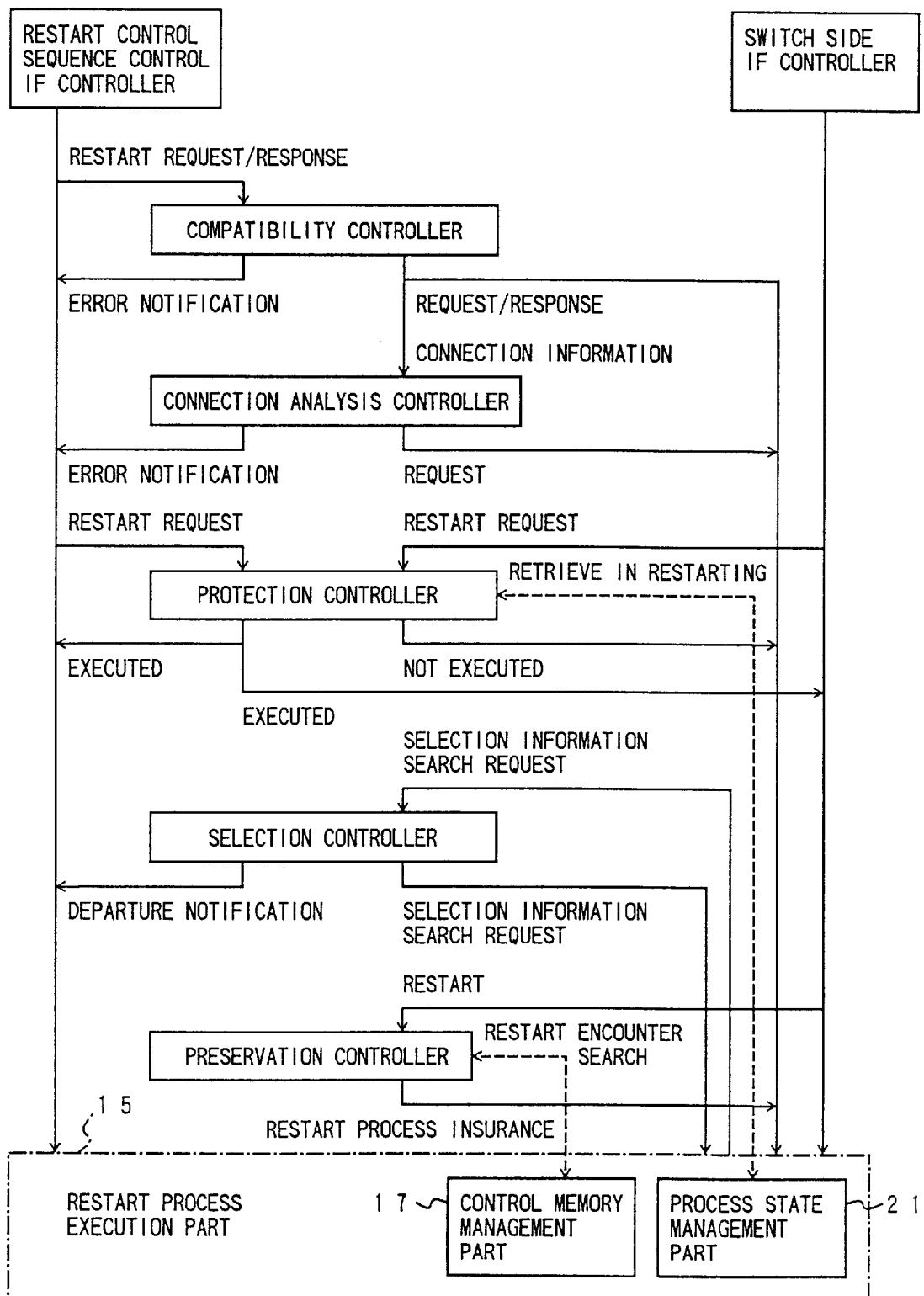
FIG. 5 is a diagram of a part of an option control part used in the embodiment of the present invention.
Figure 6:
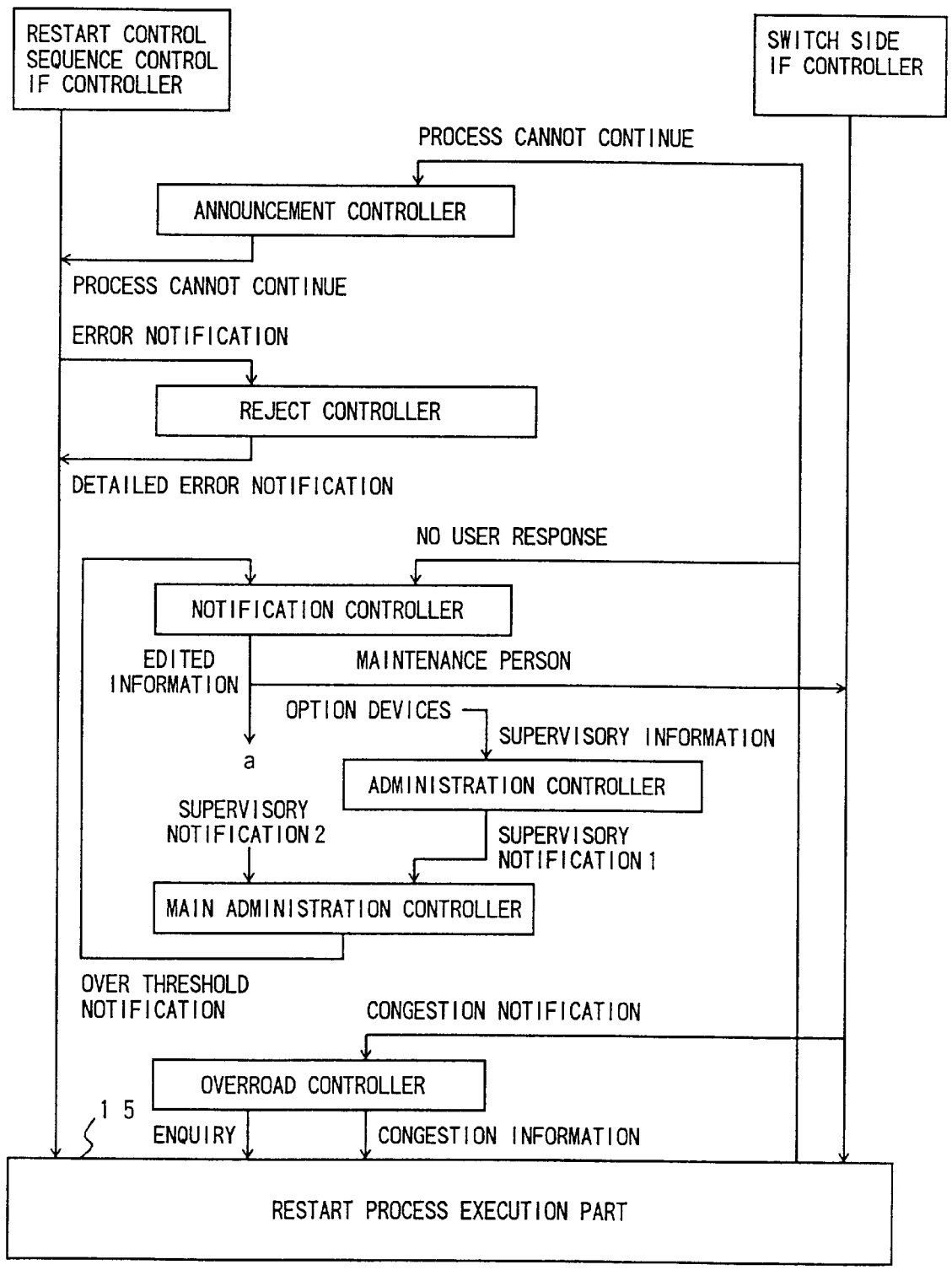
FIG. 6 is a diagram of another part of the option control part used in the embodiment of the present invention.
Figure 7:
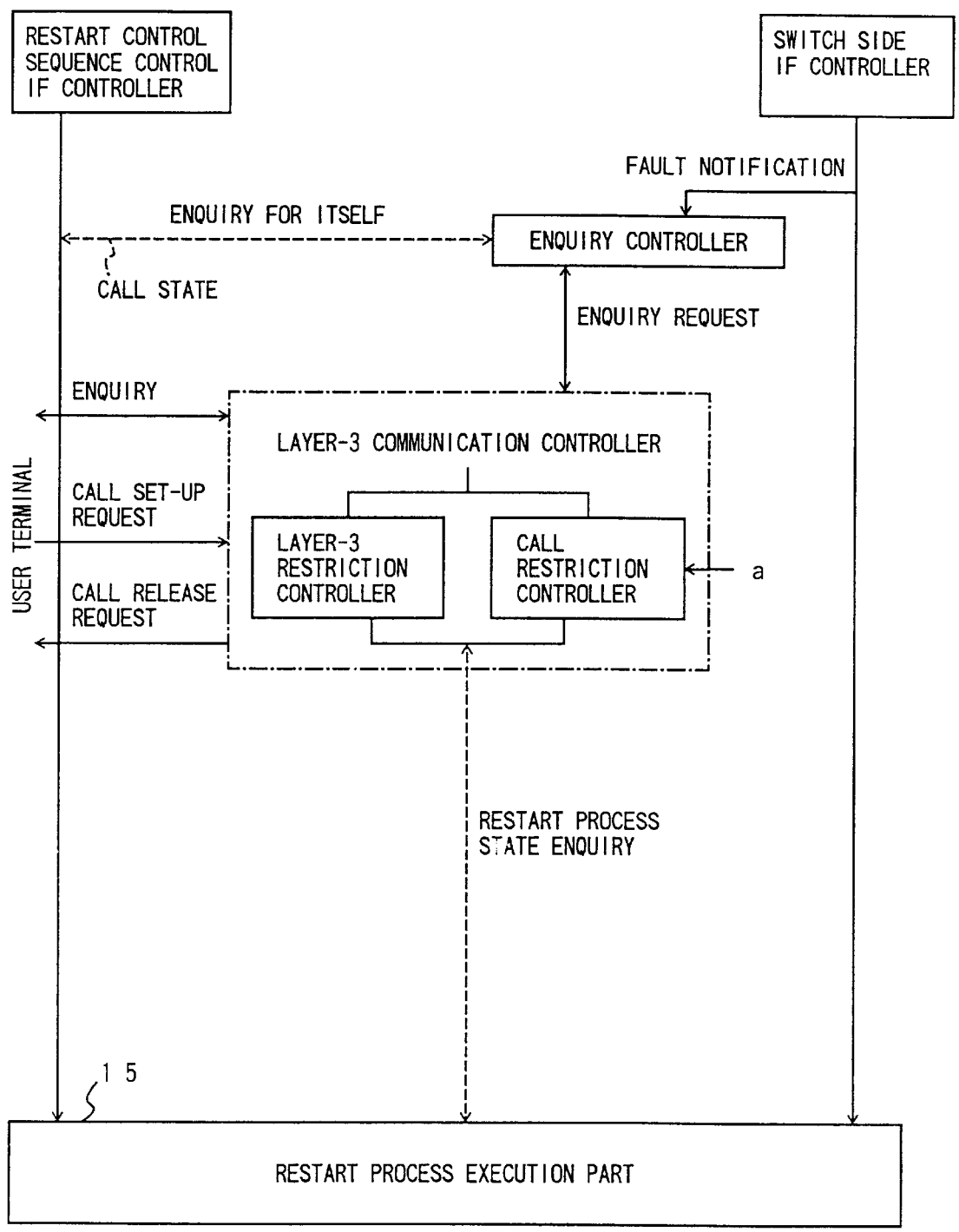
FIG. 7 is a diagram of the rest of the option control part used in the embodiment of the present invention.
Figure 8C:
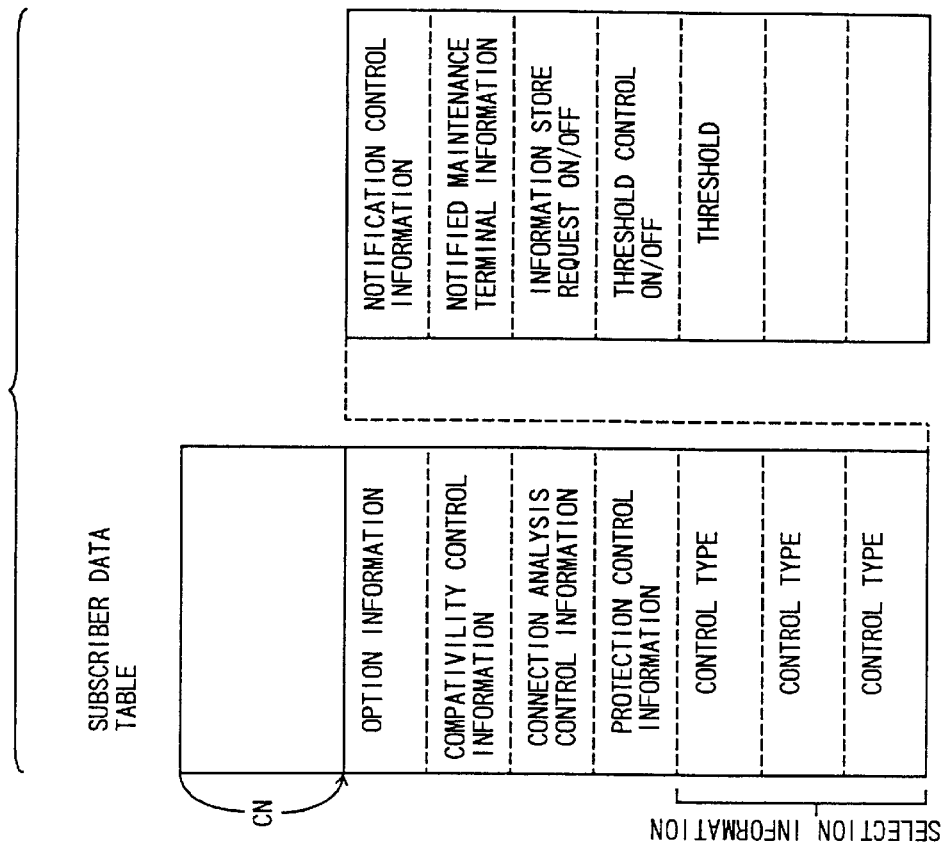
FIGS. 8A, 8B and 8C are diagrams of tables used in the embodiment of the present invention.
Figure 8B:
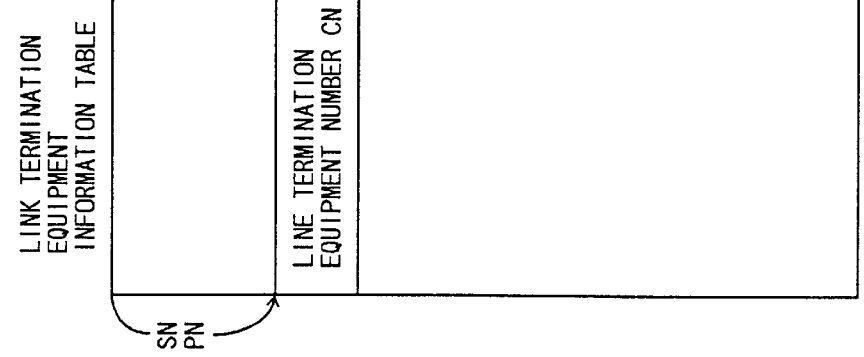
Figure 8A:
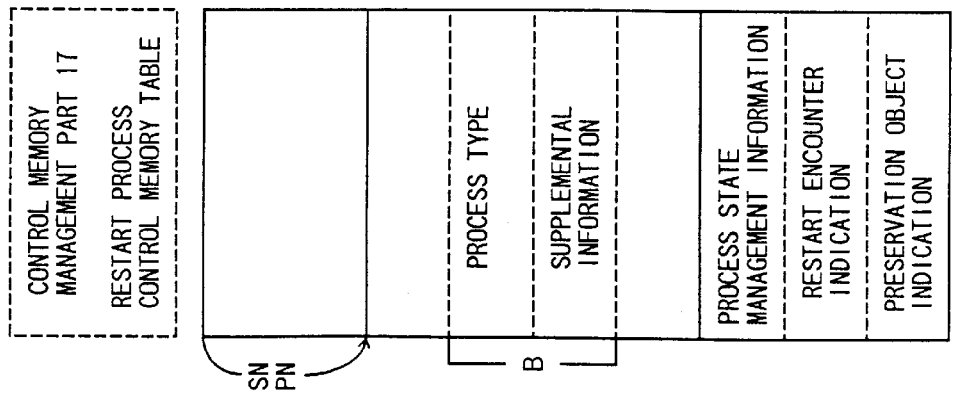

FIGS. 5, 6 and 7 are diagrams of a configuration of the option control part 14 used in the embodiment of the present invention. Some functions (devices) of the option control part 14 provide various additional services bases on an option contract with the user. The following are the functions of the option controllers of the option control part 14.

[Compatibility Controller]

A compatibility controller confirms the compatibility of information transferred between the user terminals and the switch device. If a user terminal sends the switch device incorrect information, the compatibility controller discards the incorrect information or notifies the user terminal of a transmission of the incorrect information to thereby request the user terminal to send a correct response.

[Connection Analysis Controller]

A connection analysis controller refers to a restart setting condition (SVC/PVC service) offered by a user terminal. When the restart request is generated by a user terminal and indicates a connection of the PVC or signaling link, the connection analysis controller discards the request, and notifies the user terminal of a transmission of incorrect information.

[Protection Controller]

If the layer-3 restart control function of a user terminal runs away, a large number of restart requests will be simultaneously issued. In this case, a protection controller discards the second request and all the following requests. If necessary, the protection controller notifies the user terminal of a transmission of abnormal requests and requests the user terminal to restrict the transmission of abnormal requests. Further, the protection controller operates appropriately if a similar event occurs in the switch device (for example, occurrence of a fault in the line termination equipment or frequent occurrence of recovery).

[Selection Controller]

At the time of recovery from a fault, the layer-3 communication restart controller can be operated by the initiative of either the network or the user or both thereof. The selection controller determines which one of the network initiative, user initiative and the dual initiative should be selected on the basis of the content of the offer by the user.

[Preservation Controller]

If an event of restarting the system occurs in the switch device while the layer-3 communication restart controller is operating, a preservation controller ensures execution of the restart process and notification of the process result, if necessary.

[Enquiry Controller] (FIG. 7)

If a link reset/interlink fault is detected in the signaling link of the switch device, or if the signaling controller 4 restarts, an enquiry controller enquires, when receiving a notification of the above fault, of the user terminal regarding the fault of the state of the call via the layer-3 communication controller in order to confirm whether the layer-3 sequence was correctly executed by the layer-3 communication controller with respect to the section in which the fault occurs. Alternatively, the enquiry controller enquires of the user terminal regarding the fault by itself (spontaneously).

[Announcement Controller]

The restart process execution part 15 determines whether the process can continue when receiving the restart request from a user terminal, if the part 15 detects a failure to ensure a control resource necessary to cause the part 15 to operate or a process inconsistence within the part 15. If it is determined that the part 15 cannot continue, an announcement controller receives, from the part 15, a notification showing that the part 15 cannot continue to operate, and sends a corresponding notification message to the user terminal.

[Reject Controller]

As described above, the restart control sequence control interface controller 13 checks the format of the message when receiving the restart request from a user terminal. If the controller 13 detects a departure of the specified information or a departure of the sequence, the controller 13 edits the content of the departure and notifies the internal process of the edited departure. When a reject controller receives the above edited departure, it analyzes the content of the departure, and sends a notification based on the content of the departure back to the user terminal. In this case, the restart request is discarded.

[Notification Controller]

The user terminal may not send to the switch device a response to the restart request from the switch device, if the user terminal is not equipped with the layer-3 restart control function or the restart control function of the user terminal is defection. A notification controller, which is activated by the restart process execution part 15, notifies the maintenance person that there is no response, and causes the user terminal to stop the call process. Further, the notification controller notifies a call restriction controller (which will be described later) provided in the layer-3 communication controller that there is no response.

[Overload Controller]

When an overload controller is notified of occurrence of a congestion by the system management controller 10 in the switch device, the overload controller stores the content of the notification. If the overload controller is inquired of by the restart process execution part 15, it returns congestion information thereto.

[Administration Controller]

An administration controller is provided in each of the above option controllers, and supervises the working status thereof. A main administration controller which totally manages the respective administration controllers is provided in the protocol restart device, and collects and manages a variety of information from the respective administration controllers. Threshold values are defined for the variety of collected control information. The administration controller sends a given notification to the maintenance person if the control information exceeds the corresponding threshold value.

[Call Restriction Controller]

The layer-3 communication controller receives a call set-up request from a user terminal, and captures information concerning a connection used for the call set-up service. A call restriction controller enquries of the process state management part 21 in the restart process execution part 15 as to whether the captured connection encounters a fault in the restart process for the connection. Then, the call restriction controller determines the state of a response. If the call restriction controller determines that the captured connection is the encountered connection, it edits necessary information and sends the user terminal a notification of disconnecting the call because an inconsistency will occur if the call is set up.

FIGS. 8A–8C, 9A–9B, 10A–10D and 11A–11D are diagrams of the structures of the various tables used in the embodiment of the present invention. The detail of the structures of the tables as well as the meaning of data stored therein will become apparent from the following description of the controllers.

A description will be given of a basic operation of the layer-3 communication restart controller.

Figure 12:
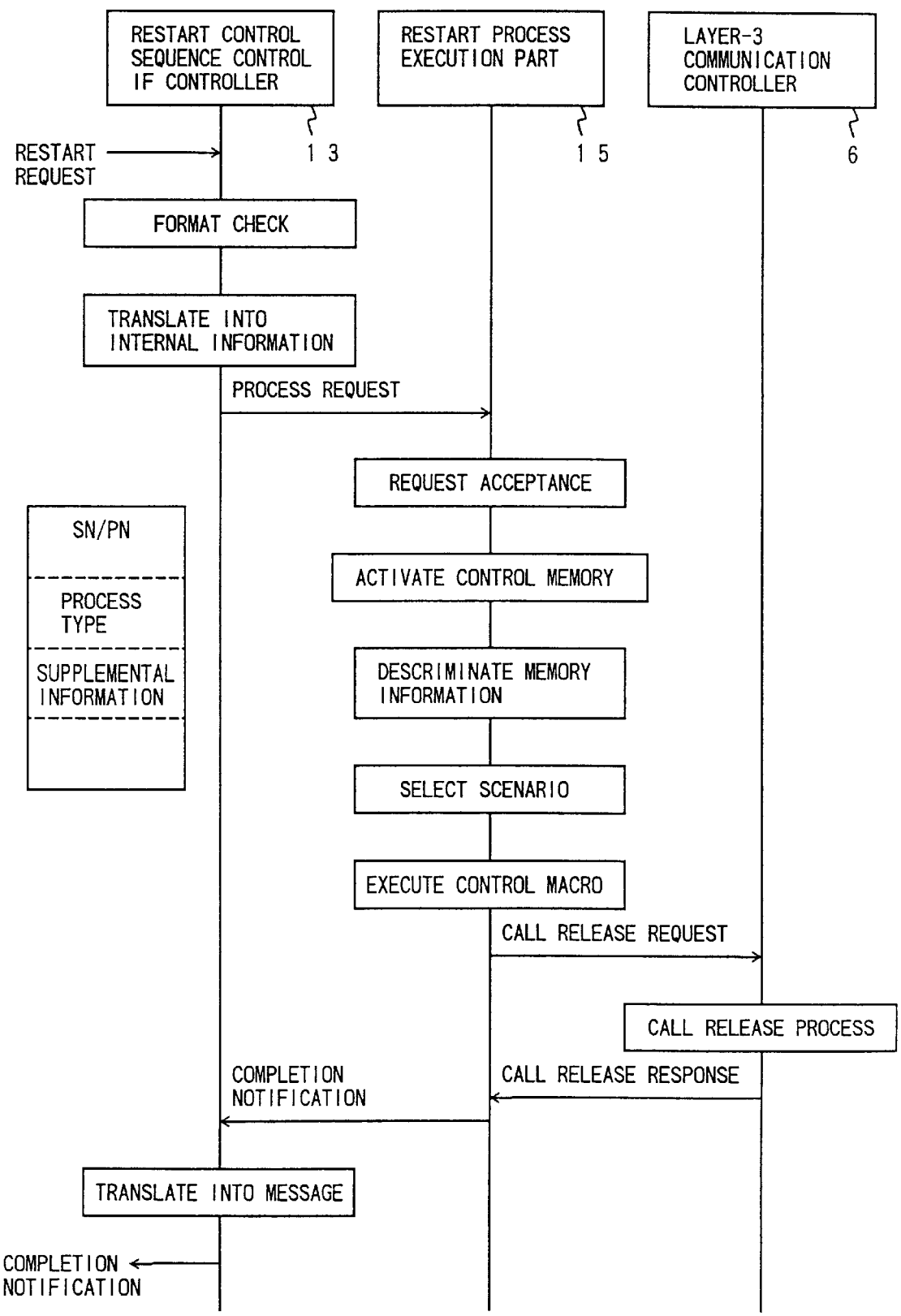
FIG. 12 is a diagram of a sequence of a restart process executed by a restart request from a user terminal.

FIG. 12 is a sequence diagram of the restart process which is executed in response to the restart request from a user device.

When the restart request (call release) is issued by a user terminal, the restart control sequence control interface controller accepts user information and performs the format check. In this case, the contents allowed, as the restart requests from the user terminals, by the layer-3 communication restart controller 7, are a line unit (physical link unit), a logical path unit (VP unit), and a logical connection unit (VC unit). These are determined taking into consideration the operation formations of the user terminals. If the format check is passed, the above interface controller translates the user information into internal information, and sends the process request to the restart process execution part 15. The above process request includes the number SN of the signaling controller which terminates the signal link, its port number PN, the process type (restart), and supplemental information (VPI/VCI).

In the restart process execution part 15, the process request acceptance part 16 accepts the process request, and activates the control memory management part 17 so that a necessary control memory (start transition rule) is captured. Thereafter, the restart process state control execution part 18 determines control information in the captured control memory. The control scenario management part 19 selects a control scenario which describes the process sequence (procedure). Thus, the control macro of the control macro management part 20 is executed.

A call release request generated by the execution of the control macro is transferred to the layer-3 communication controller 6, which releases the corresponding call. When the controller 6 completes the call release process, it sends a call release response to the restart process execution part 15, which notifies the interface controller 13 of completion of the call release process. Then, the interface controller 13 translates the notification of the completion into a given message, which is transmitted to the user terminal.

Figure 13:
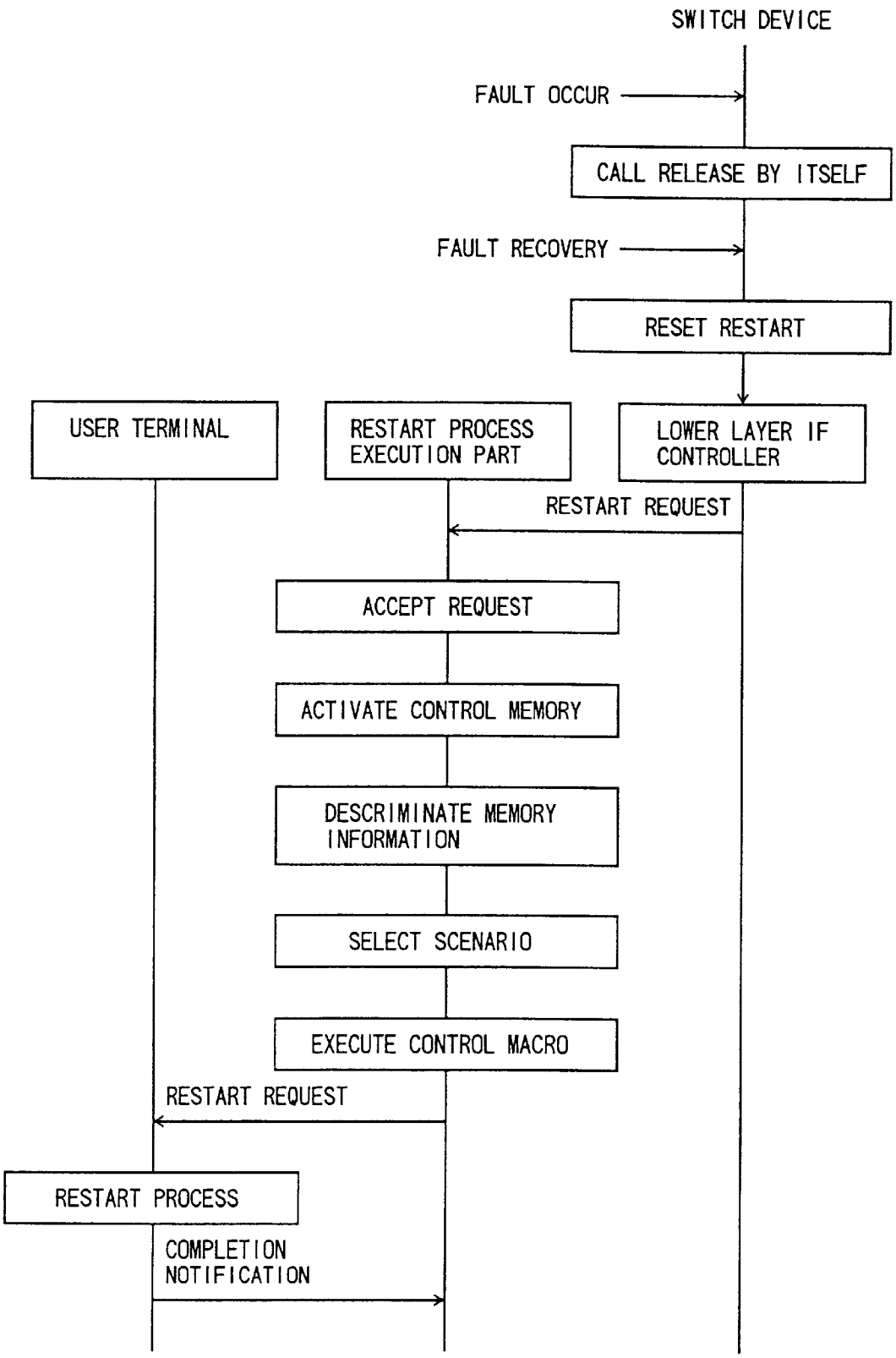
FIG. 13 is a diagram of a sequence of the restart process executed by a restart request from the switch device.

FIG. 13 is a sequence diagram of the restart process which is executed when the switch device issues the restart request. If a fault occurs which makes it impossible to ensure the restarting of the switch device or system or the call process for the device failure, the switch device releases the related call by itself by the layer-3 communication controller 6. However, the user terminal is not ensured to be correctly notified of the call release sequence carried out when a fault occurs. Hence, an incompatibility of the call process may occur between the switch device and the user terminal after the fault is eliminated. In order to avoid the above, the switch device issues the restart request to the user terminal when the fault is eliminated. Hence, the compatibility with the user devices can be ensured. The restart request may be issued against the user device by inputting a given command by the maintenance person.

In FIG. 13, if the line termination equipment 2 is recovered from a fault, the line termination equipment 2 is restarted. Hence, a request for the issue of the restart request is generated by the lower-layer control device 9. The lower-layer interface controller accepts the above request, and transfers the request to the restart process execution part 15. In this case, the contents which the layer-3 communication restart controller 7 tolerates as the restart request from the switch device are the line unit (physical link unit), the logical path unit (VP unit), and the logical connection unit (VC unit) when taking into account the work formation of the user device and the formation of fault process.

In the restart process execution part 15, the process request acceptance part 16 accepts the process request, and activates the control memory management part 17 in order to acquire the necessary control memory (state transition rule). Then, the restart process state control execution part 18 determines the control information in the control memory, and selects, on the basis of the control information, the scenario which describes the process sequence through the control scenario management part 19. Thus, the control macro of the control macro management part 20 is executed.

The restart request generated by the execution of the control macro is transferred to the user terminal via the restart control sequence control interface controller. Then, the restart control function in the user terminal releases the setting of the corresponding call. If a response to the releasing of the call is sent by the user terminal, the restart process is terminated.

Figure 14:
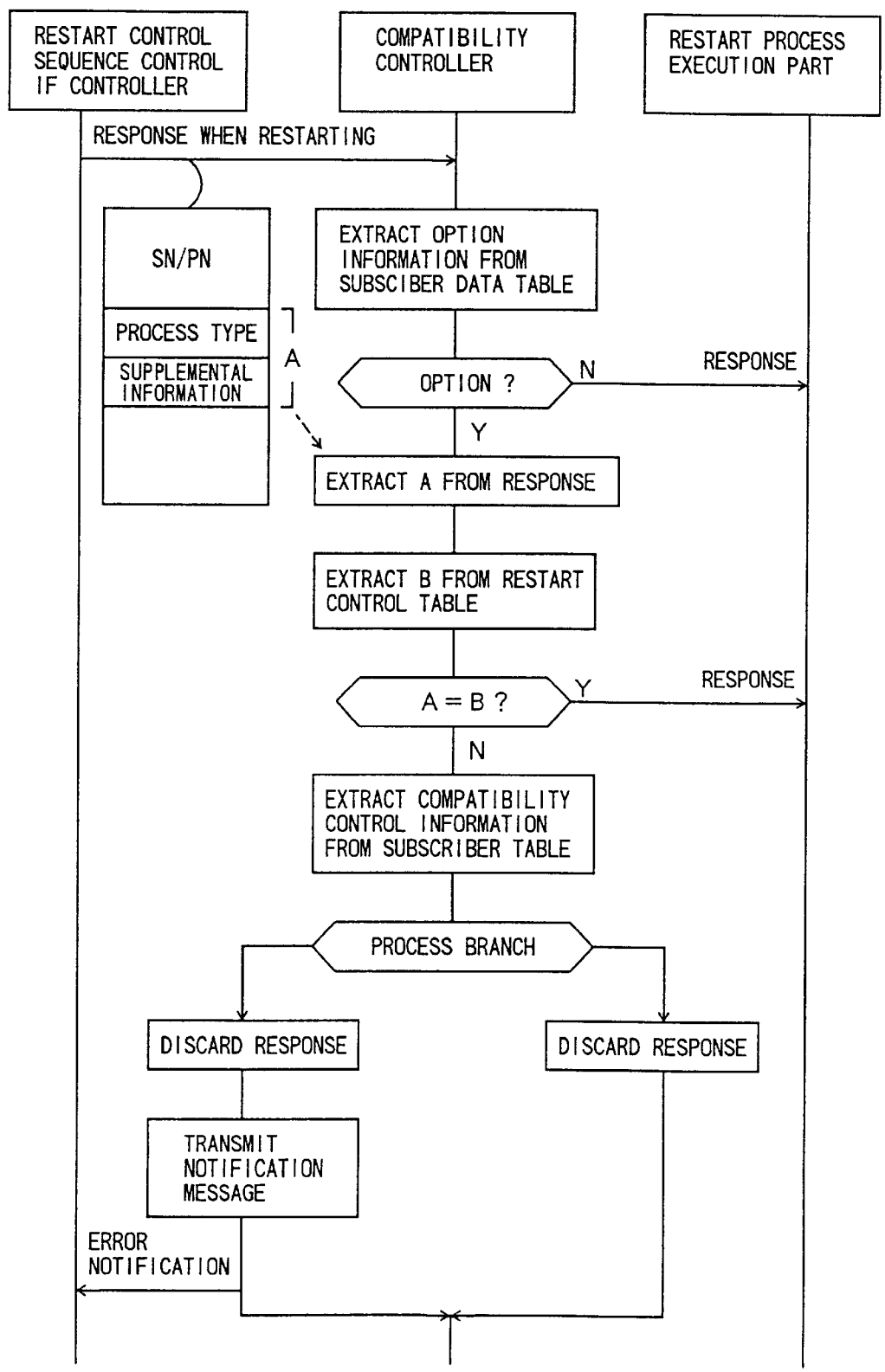
FIG. 14 is a diagram of a sequence of a compatibility control.
Figure 15:
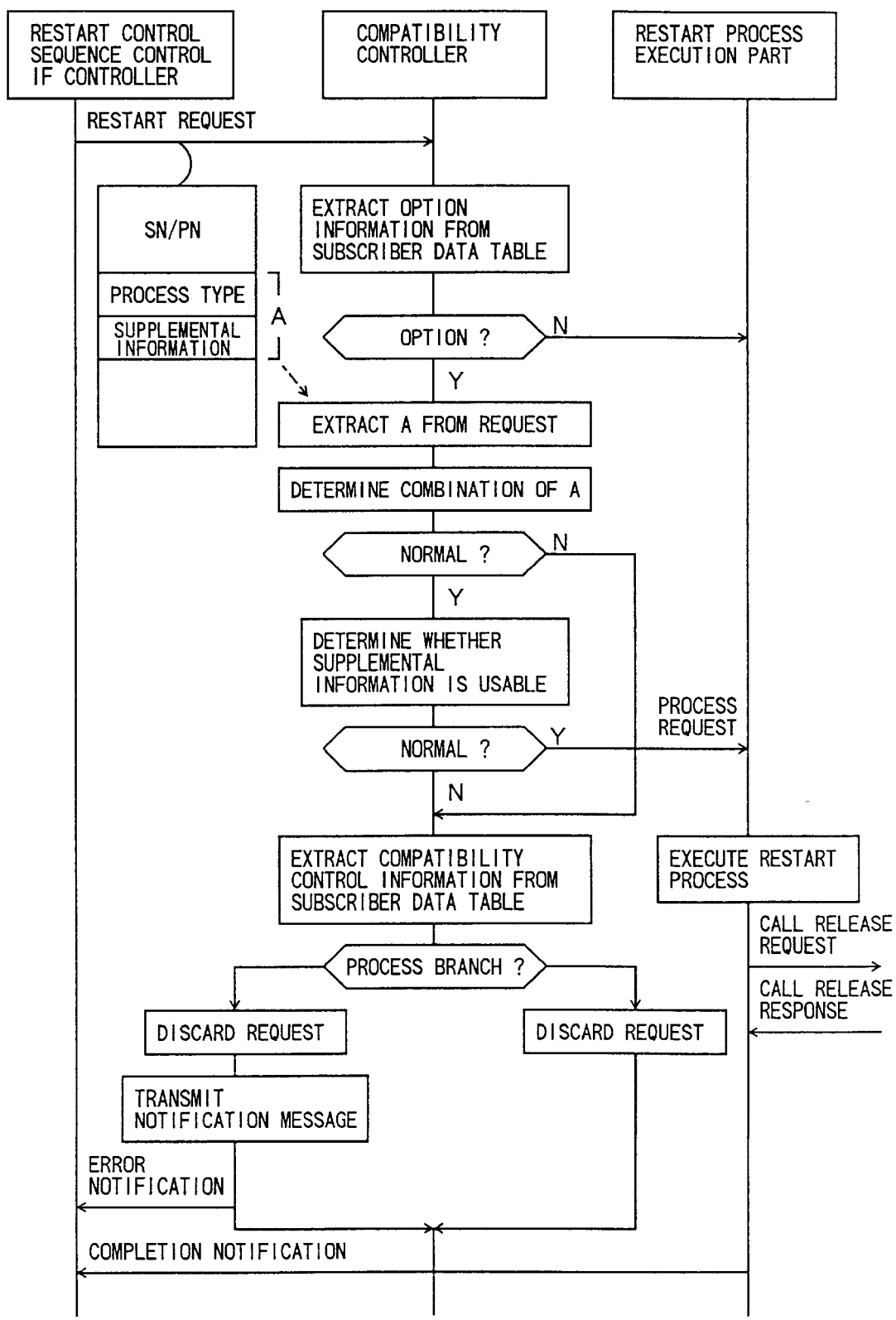
FIG. 15 is a diagram of another sequence of the compatibility control.

FIGS. 14 and 15 are diagrams showing the compatibility control.

More particularly, FIG. 14 shows a sequence of the compatibility control executed when the response to the restart request issued by the switch device is sent by the user terminal and is received. When the response from the user terminal responsive to the restart request issued by the switch device is received, the process is transferred to the compatibility controller. The above response includes the signaling controller number SN which terminals the signaling link, the part number PN thereof, the process type, and supplemental information (VPI/VCI).

The compatibility controller extracts the line termination equipment number CN by accessing the line termination equipment information table by using the SN and PN. Then, the compatibility controller searches the subscriber data table shown in FIG. 8C by using the obtained number CN, and extracts the option information concerning the compatibility control of the involved subscriber data. Then, the compatibility controller checks whether the option contract of the compatibility control has been made. If the result is negative, the compatibility controller transfers the process (response) to the restart process execution part 15.

If the option contract has been made, the service of the compatibility control is available. In this case, the compatibility controller extracts information A (process type, supplemental information) from the response sent by the user terminal. Then, the compatibility controller extracts information B (process type, supplemental information) corresponding to the information A by accessing the restart process control memory table of the control memory management part 17 shown in FIG. 8A by using the SN and PN. The information B includes the process type (restart) and supplemental information (VPI/VCI) relating to the restart request issued by the switch device.

The compatibility controller determines whether A=B. If A=B, then the compatibility controller transfers the process (response) to the restart process execution part 15. If A is not equal to B, the compatibility controller extracts the compatibility control information from the subscriber data table, and conditionally performs processes which branch in accordance with a user's instruction written therein beforehand. An example of the case where A is not equal to B is such that the use terminal issues a response including an indication of the logical path in response to the restart request which is issued by the switch device and includes an indication of the line (physical link).

In the above branch process, if the user requests a notification beforehand, the compatibility controller discards the response, and notifies the user terminal of receipt of erroneous information. If the user requests that such a notification is needed, the compatibility controller merely discards the response. If there is no indication, the switch device provides one of the above serves in accordance with the basic function thereof.

FIG. 15 shows a compatibility control responsive to the restart request from the user terminal. When the restart request is issued by the user terminal, the compatibility controller performs a given check. If the check is passed, the process is transferred to the connection analysis controller. The restart request includes the signaling controller number SN which terminates the signaling link, the port number PN thereof, the process type (restart), and supplemental information (VPI/VCI).

In the above manner, the compatibility controller checks the existence/non-existence of the option contract, and transfers the process to the restart process execution part 15 if the option contact is not made. If the option contract is made, the compatibility controller extracts the information A (process type, supplemental information) from the received information contained in the response, and makes a decision as to whether it has been informed of the necessary information (supplemental information) corresponding to the request type (in other words, the combination of the contents indicated in the information A is acceptable). If the above decision is affirmative, the compatibility controller determines whether the restart process execution part 15 can accept the necessary information. If the determination result shows that the necessary information is acceptable, the compatibility controller determines the normal restart request, and transfers the process to the restart process execution part 15.

If the combination of the contents indicated in the information A is not acceptable or the supplemental information has a content which cannot be accepted by the restart process execution part 15, the compatibility controller extracts the compatibility control information from the subscriber data table, and conditionally performs processes which branch in accordance with the user's instruction written therein. For example, the restart process execution part 15 will reject the restart request, if the restart request is based on the line (physical link) unit but includes supplemental information based on the logical path (VP) unit or the logical connection (VC) unit.

In one of the branch processes, if the user requests a notification beforehand, the compatibility controller discards the response, and notifies the user terminal of receipt of erroneous information. If the user requests that such a notification is needed, the compatibility controller merely discards the response. If there is no indication, the switch device provides one of the above services (the notification is sent or not sent) in accordance with the basic function thereof.

Figure 16:
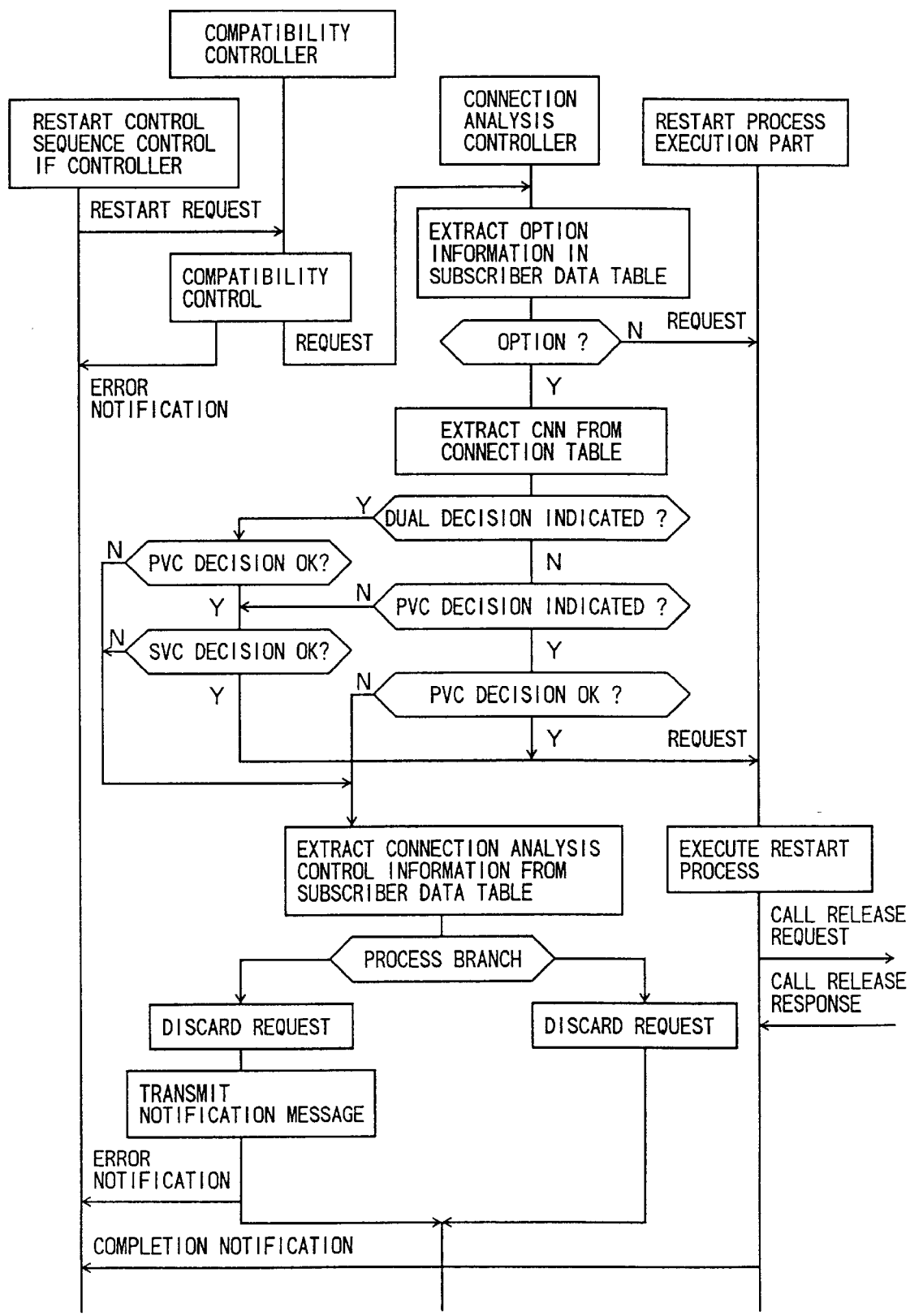
FIG. 16 is a diagram of a sequence of a connection analysis control.

FIG. 16 is a diagram showing the connection analysis control. When the restart request issued by the user terminal is received, the compatibility controller performs the necessary check as described above. If the check is passed, the process is taken over to the connection analysis controller. The restart request includes the signaling controller number SN which terminates the signaling link, the port number PN thereof, the process type, and the supplemental information (VPI, VCI).

The connection analysis controller extracts, based on the line termination equipment CN obtained from the SN and PN, the option information concerning the connection analysis control from the subscriber data table. If there is no option specified, the connection analysis controller transfers the process to the restart process execution part 15. If the option is obtained, the connection analysis controller extracts information CNN (PVC, SVC) concerning the connection type corresponding to the VPI and VCI from the connection management table shown in FIG. 10D. Then, the connection analysis controller performs the following analysis process according to the user's indication written in the option information beforehand.

In this case, the PVC or the signaling link excluded by the following decision is affected by the formation of the working of the SVC services of a user terminal in which the PVC and SVC coexists. Hence, one of the dual decisions, PVC decision and signaling link decision (SVC decision) is made selectable. If both decisions are indicated, both the PVC decision and the SVC decision are made. The PVC decision is directed to determining whether the connection information of the restart request specifies the PVC. The SVC decision is directed to determining whether the connection information of the restart request specifies the SVC. If the results of both the decisions indicated are normal (neither the PVC nor signaling link is specified), the connection analysis device transfers the process to the restart process execution part 15. In the PVC decision, only the PVC decision is made and the SVC decision is not made. In the SVC decision, only the SVC decision is made and the PVC decision is not made. In each of the PVC and SVC decisions, if the result thereof is normal, the connection analysis device transfer the process to the restart process execution part 15.

If the results of the above decisions are not normal, the connection analysis device extracts the connection analysis control information from the subscriber data table, and conditionally performs processes which branch in accordance with the user's instruction written therein beforehand. That is, if the user device request the notification in the restart request, the connection analysis device discards the restart request, and notifies the user device that erroneous information is received. If the user device does not request the notification in the restart request, the connection analysis device discards the restart request from the user device. If there is no indication as to the notification request, the notification is sent or not sent in accordance with the basic function of the switch device.

Figure 17:
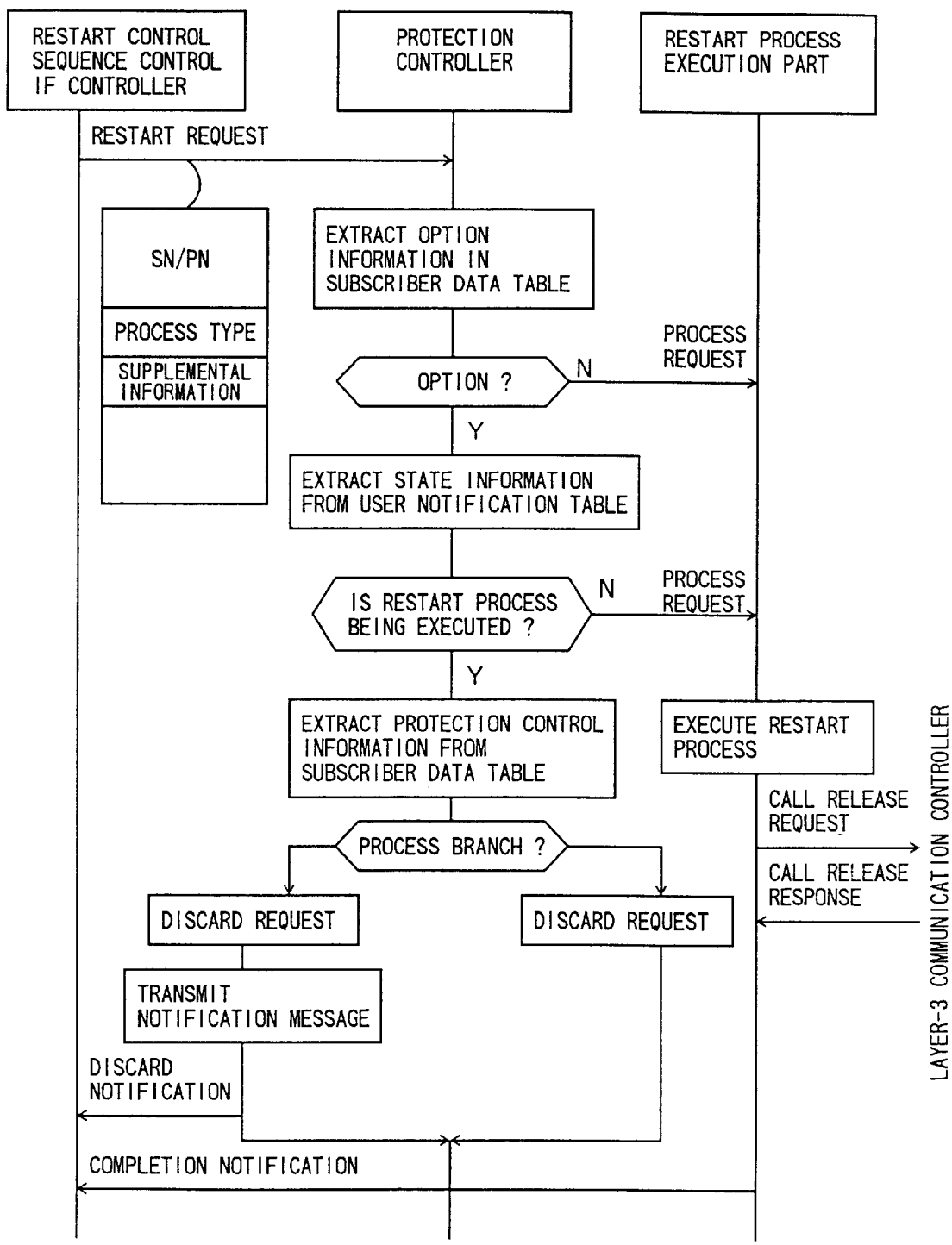
FIG. 17 is a diagram of a sequence of a protection control.
Figure 18:
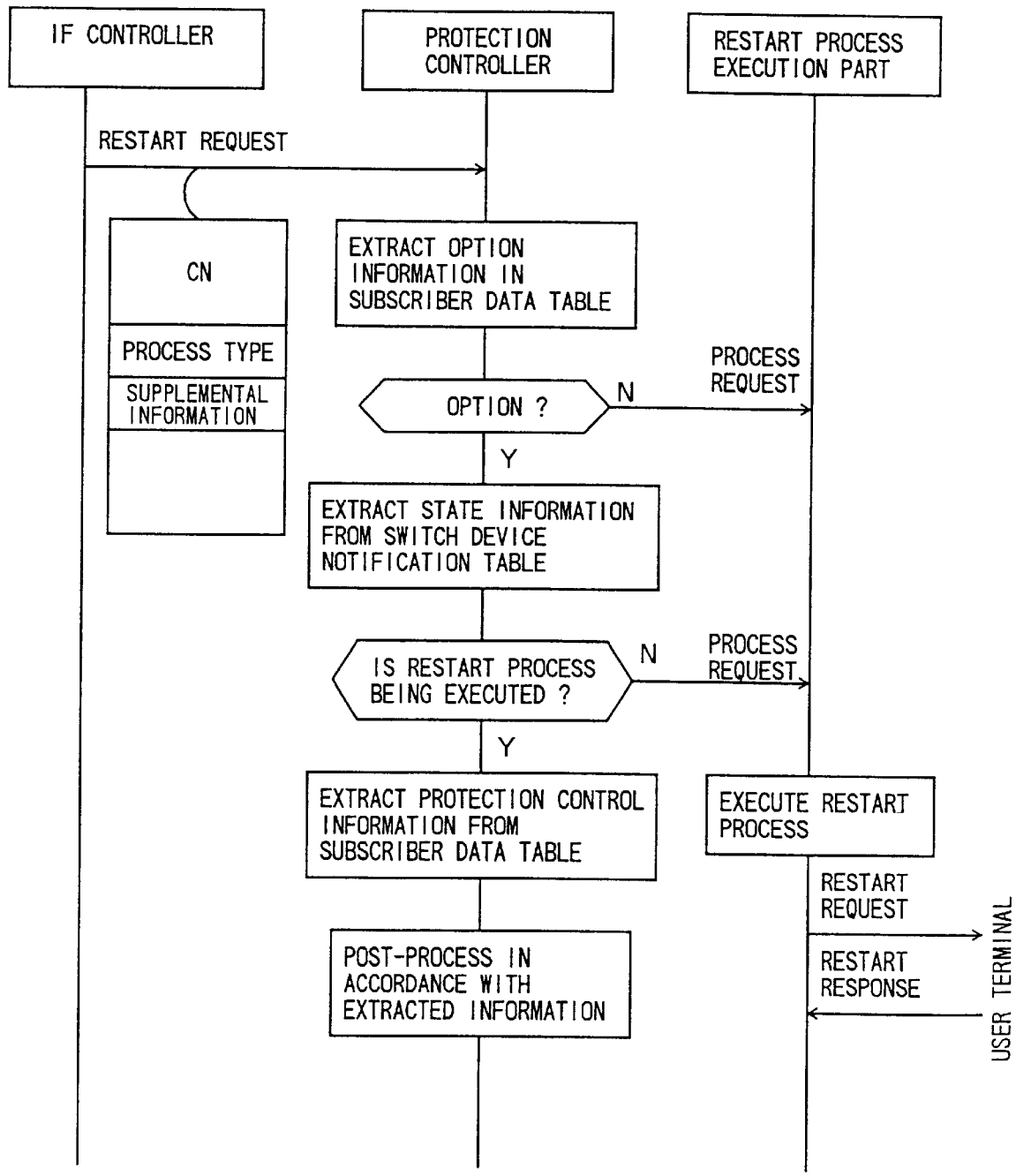
FIG. 18 is a diagram of another sequence of the protection control.

FIGS. 17 and 18 are diagrams showing a protection control.

More particularly, FIG. 17 shows a sequence of the protection control executed when the user terminal frequently issues the restart request. When the restart request issued by the user terminal is received, it is transferred to the protection controller. The above restart request includes the signaling controller number SN which terminates the signaling link, the port number PN thereof, the process type and the supplemental information (VPI/VCI).

The protection controller extracts, based on the line termination equipment CN obtained from the SN and PN, the option information (existence/non-exsistence of retrieval) concerning the protection control from the subscriber data table. If there is no option specified, the protection controller transfers the process to the restart process execution part 15. If the option is obtained, the protection controller extracts state information corresponding to the SN and PN from the user notification restart process management information table shown in FIG. 9, and determines, based on the restart request from the user terminal, whether the restart process is already executed. If the result is negative, the protection controller accepts the present restart request, and transfers the process to the restart process execution part 15.

If the restart process is being executed, the protection controller extracts the protection control information from the subscriber data table, and conditionally performs processes which branch in accordance with the user's instruction written therein beforehand. That is, if the user terminal requests the notification, the protection controller discards the present restart request, and notifies the user terminal of receipt of erroneous information. If the user terminal indicates that the notification is not needed, the protection controller discards the restart request from the user terminal. If there is no indication from the user terminal, the notification is sent or not sent in accordance with the basic function of the switch device.

FIG. 18 shows a sequence of the protection control executed when the restart request is frequently issued by the switch device. When the restart request is issued by the switch device, the process is transferred to the protection controller. The above restart request includes the number CN of line termination equipment in which a fault occurs, the process type, and the supplemental information (VPI/VCI).

The protection controller extracts, based on the number CN, the option information (existence/non-exsistence of retrieval) from the subscriber data table. If there is no option, the protection controller transfers the process to the restart process execution part 15. If the option is indicated, the protection controller extracts the state information corresponding to the CN from the restart process management information table of the process state management part 21 shown in FIG. 9. Then, the protection controller determines whether the restart process issued by the switch device is being executed by the user terminal. If the result is negative, the protection controller accepts the present restart request, and transfers the process to the restart process execution part 15.

If it is determined that the restart process is already being executed, the protection controller extracts the protection control information from the subscriber data table, and executes a post-process in accordance with the extracted control information. In the above post-process, all restart requests having the above states are discarded. Alternatively, all the restart requests issued in a given section are arranged in the receiving order and are executed. Alternatively, the restart request which is held for the last time is executed when the current execution of the restart process is completed. Hence, flexible services can be provided.

Figure 19:
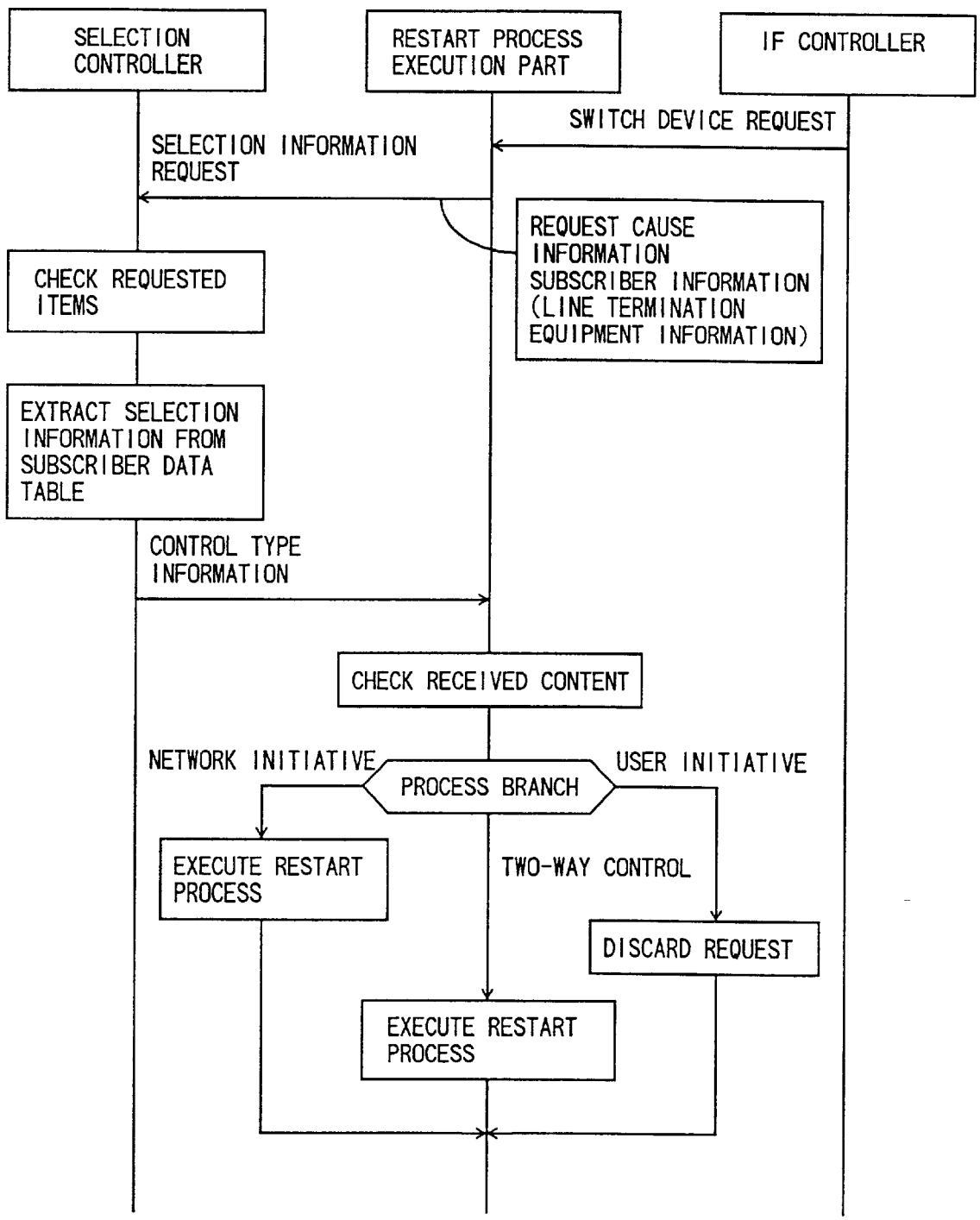
FIG. 19 is a diagram of a sequence of a selection control.
Figure 20:
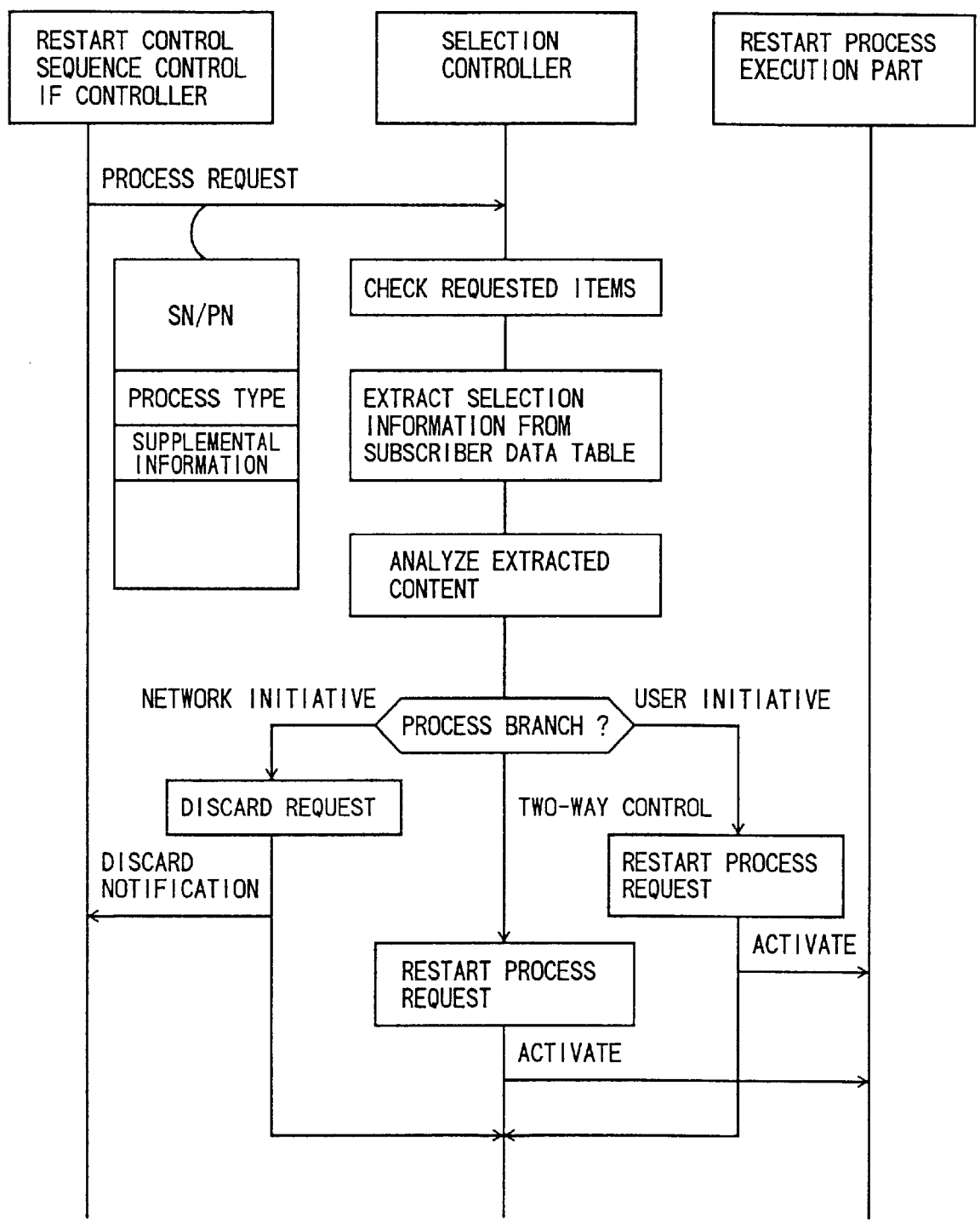
FIG. 20 is a diagram of another sequence of the selection control.

FIGS. 19 and 20 are diagrams showing the selection control.

More particularly, FIG. 19 shows a sequence of the selection control executed when the restart request is issued by the switch device. When the restart request is issued by the switch device, the restart process execution part 15 requests the selection controller to send the selection information. The above restart request includes information concerning a source which causes the above restart request (the type of a fault or the like), and the subscriber information (line termination equipment information CN).

The selection controller checks whether the contents of the request are acceptable, and searches the selection information stored in the subscriber data table by using the number CN. Further, the selection controller extracts information concerning the control type corresponding to the information concerning the request source. The extracted information is sent back to the restart process execution part 15. The control type includes a network-initiative control, a user-initiative control and an interactive (two-way) control.

The restart process execution part 15 analyzes the received contents, and conditionally performs processes which branch based on the result of the analysis. If the control type is the network-initiative control or the interactive control, the restart process execution part 15 executes the restart process for the restart request issued by the switch device. If the control type is the user-initiative control, the restart process execution part 15 discards the restart request because there is no need to notify the user terminal of the restart request.

FIG. 20 shows a sequence of the selection control executed when the restart request is issued by the user terminal. The restart request issued by the user terminal is transferred to the selection controller. The above restart request includes the signaling controller number SN which terminates the signaling link, the port number PN thereof, the process type (information concerning a source which causes the restart request), and supplemental information (VPI/VCI).

The selection controller checks that the requested contents are acceptable, and searches the selection information stored in the subscriber data table by using the line termination equipment device number CN obtained from the SN and PN. Further, the selection controller extracts information concerning the control type corresponding to the information concerning the source which causes the restart request). Then, the selection controller analyzes the extracted information, and conditionally performs processes which branch in accordance with the information concerning the control type. If the control type is the network-initiative control, the selection controller discards the restart request because there is no need to receive the restart request issued by the user terminal. Then, the selection controller notifies the user terminal that the restart request is discarded. If the control type is the interactive control or the user-initiative control, the selection controller activates the restart process execution part 15.

Figure 21:
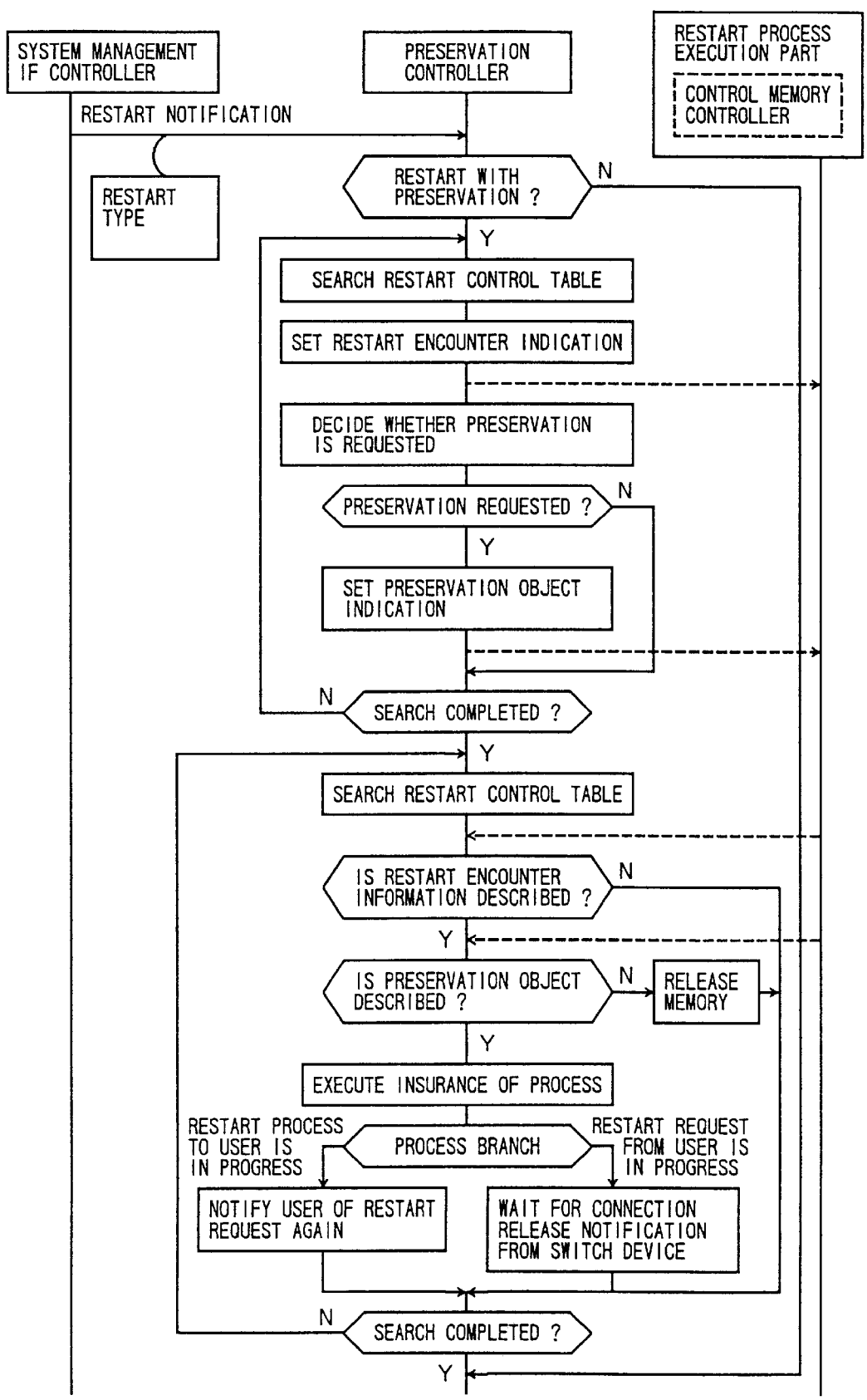
FIG. 21 is a diagram of a sequence of a preservation control.
Figure 22:
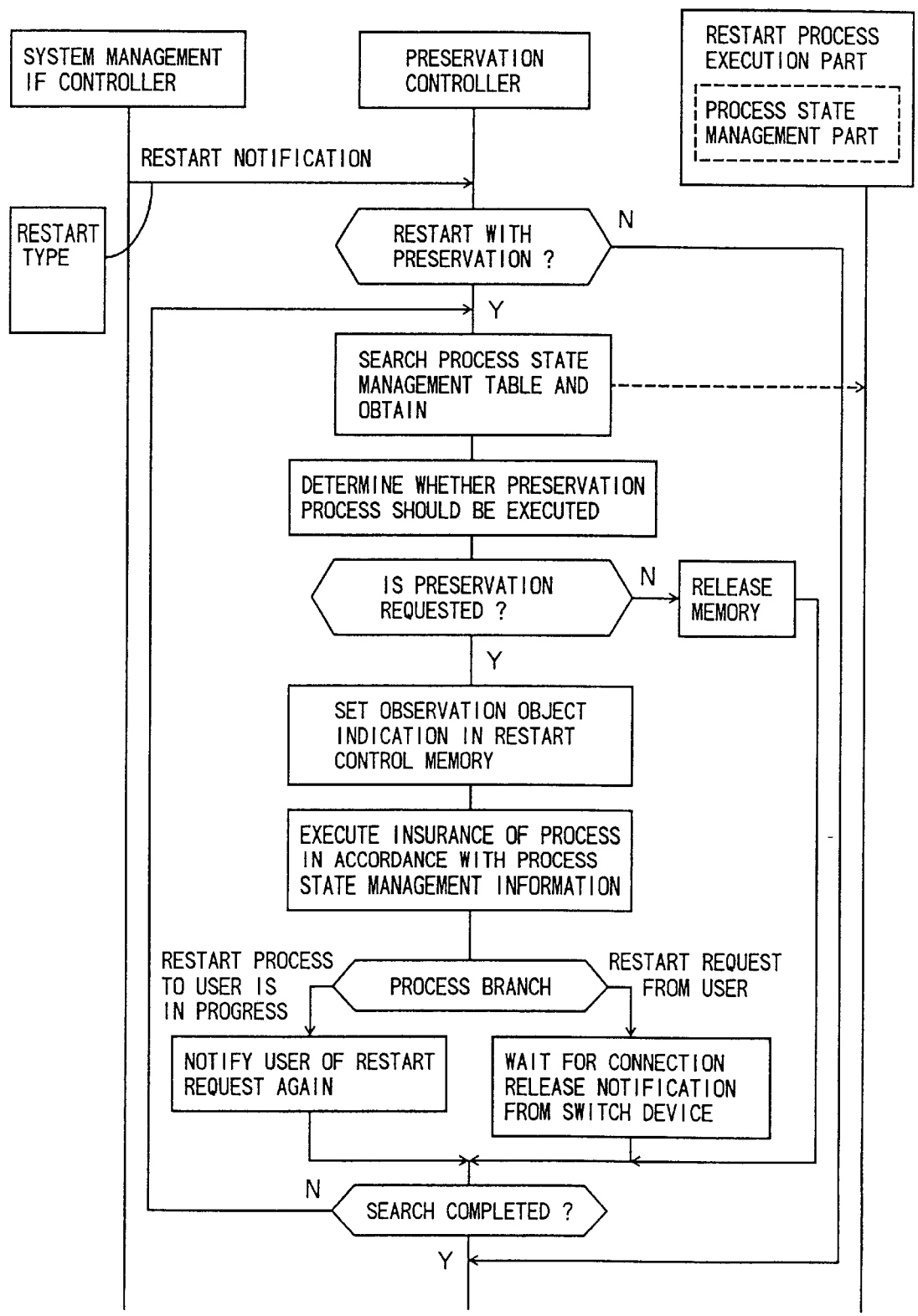
FIG. 22 is a diagram of another sequence of the preservation control.

FIGS. 21 and 22 are diagrams showing the preservation control.

More particularly, FIG. 21 shows a sequence of the preservation control executed when the control memory management part 17 is used.

The notification of the restart sent by the system management interface controller is transferred to the preservation controller. The above notification includes the restart type.

The preservation controller extracts information indicating that the preservation should be made from the preservation decision table shown in FIG. 9D by using the restart type. If the preservation is not needed in the restart request, the process shown in FIG. 9D is ended.

If the preservation is needed in the restart request, the preservation controller searches a given area in the restart process control memory table of the control memory management part 17 from the beginning thereof, and extracts the memory which is now in use for the restart process. Then, the preservation controller sets a restart encounter indication of the extracted memory, and determines, based on the preserved-object process information in the preservation decision table, whether the preservation process should be executed. If it is determined that the preservation process should be executed, the preservation controller sets the preserved-object indication in the restart process control memory table. The extraction of all memories which are now in use is carried out for all areas.

When the extraction of the memories which are in use is completed, the preservation controller executes an ensuring control of the restart process on the basis of the process state management information stored in the restart process control memory table. The process state management information holds the processing history of the restart process execution part 15.

In the ensuring control, the preservation controller searches a given area in the restart process control memory table, and determines whether the above-mentioned restart encounter indication is set. If the setting of the restart encounter indication is found, the preservation controller executes ensuring the restart process in accordance with the process state management information in the restart process control memory table occurs. That is, when the restart process to the user terminal is being executed, the preservation controller notifies the user terminal of the restart request again. When the restart process issued by the user terminal is being executed, the preservation controller waits for a notification of the connection release from the switch device (layer-3 communication control device 7).

When it is determined that the setting of the restart encounter indication is not found, the preservation controller proceeds with a decision as to whether the next search for the restart process control memory table should be carried out. If the setting of the preserved-object indication is not found, the preservation controller releases the memory which is in use, and proceeds with a decision as to whether the next search for the restart process control memory table should be carried out. The ensuring control to the memories which are in use are carried out for all the areas.

FIG. 21 shows a sequence of the preservation control which utilizes the process state management part 21. A notification of the restart from the system management interface controller is transferred to the preservation controller. The above notification includes the information indicative of the restart type.

The preservation controller looks up the preservation decision table and extracts the information concerning whether the preservation should be made by using the information indicative of the restart type. Then, the preservation controller determines whether or not the restart process requests the preservation. If the result is negative, the process shown in FIG. 22 is passed.

If the restart process requests the preservation, the preservation controller retrieves the process state management table of the process stage management part 21 shown in FIG. 9C, and extracts the state of execution of the restart process initiated by the restart request from the switch device. More particularly, the preservation controller searches the process state management table, and extracts a block number of the restart process control memory. Further, the preservation controller determines whether the preservation process should be executed on the basis of the process state management information referred to by the above block number, and the preserved-object process information searched for using the above restart type in the preservation table.

If the preservation is requested, the preservation controller performs the setting of the preserved-object indication in the restart process control memory table. Further, the preservation controller ensures that the restart process in accordance with the process state management information in the restart process control memory table occurs. That is, when the restart process to the user terminal is being executed, the preservation controller notifies the user terminal of the restart request again. When the restart process issued by the user terminal is being executed, the preservation controller waits for a notification of the connection release from the switch device (layer-3 communication control device 7). If it is determined that the preservation is not requested, the preservation controller releases the memory which is in use (extracted by the above block number), and proceeds with a decision whether the next search should be carried out. In the above manner, the search and the ensuring control are carried out for all items in the process state management table.

Figure 23:
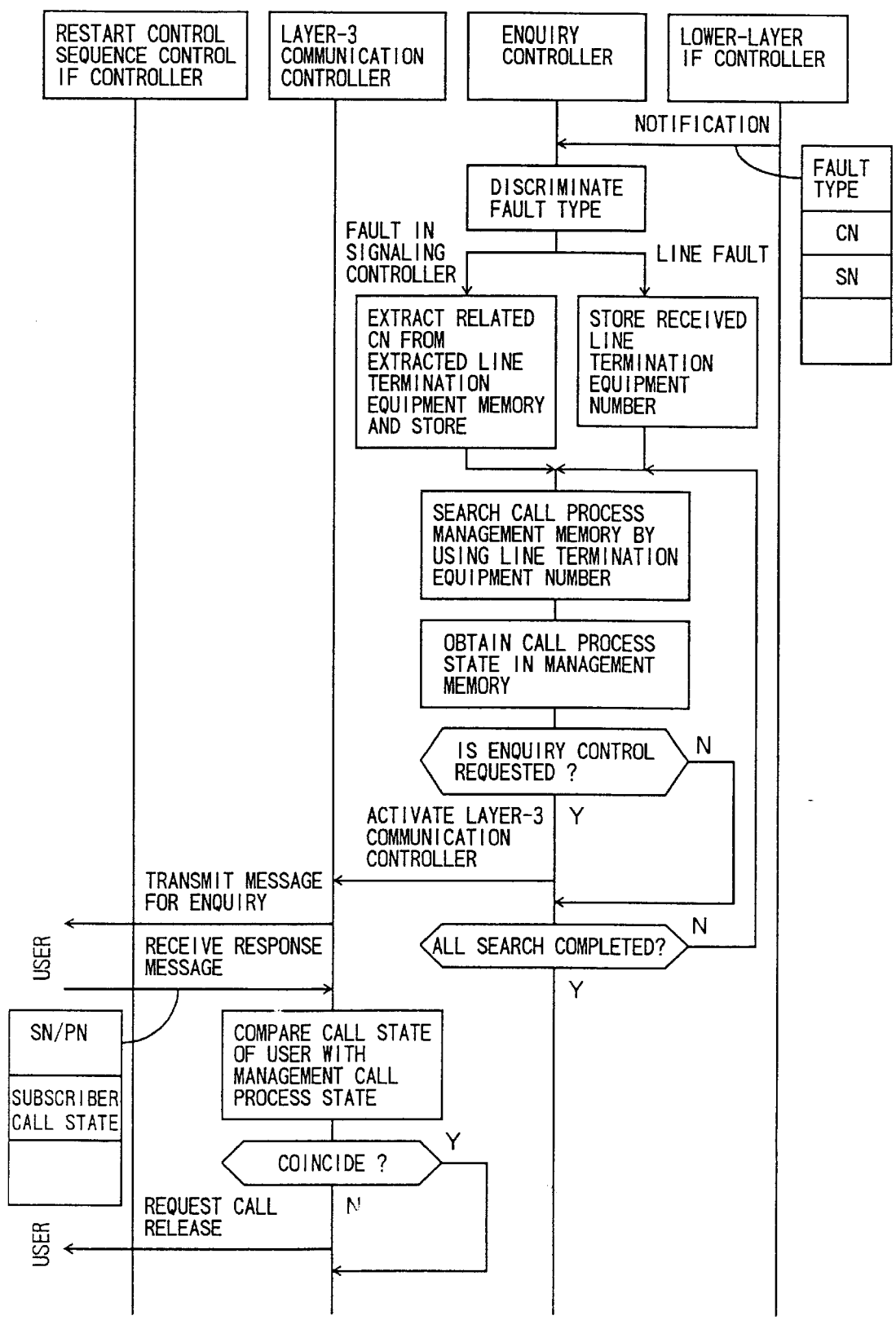
FIG. 23 is a diagram of a sequence of an enquiry control.
Figure 24:
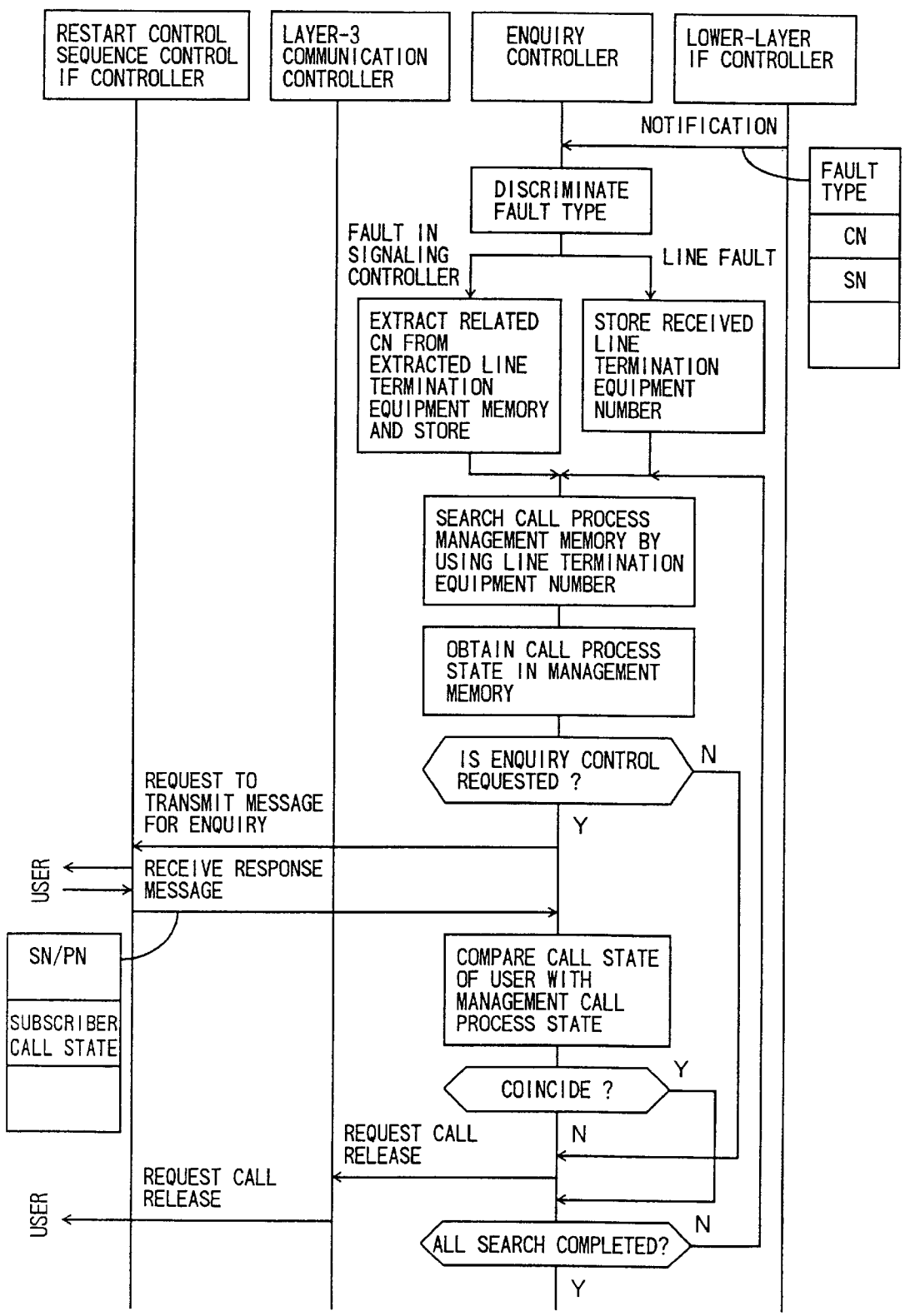
FIG. 24 is a diagram of another sequence of the enquiry control.

FIGS. 23 and 24 are diagrams showing an enquiry control.

FIG. 23 shows a sequence of the enquiry control executed when the layer-3 communication controller is used. If the link reset/interlink fault of the signaling link is detected, or if the signaling controller 4 restarts, notification information concerning the above fault is issued via the lower-layer interface controller, and is input to the enquiry controller. The above notification information includes the fault type, and the line termination equipment number CN/signaling controller SN in which the fault occurs.

The enquiry controller determines the fault type, and conditionally performs processes which branch in accordance with the results of the determination. If a fault occurs in the signaling controller 4, the enquiry controller extracts the line termination equipment number CN relating to the signaling controller 4 from the extracted line termination equipment memory shown in FIG. 11A by referring to the SN, and stores it in a work memory. If a fault occurs in the line (physical link), the enquiry controller stores the corresponding line termination equipment number CN in the work memory.

Figure 11A:
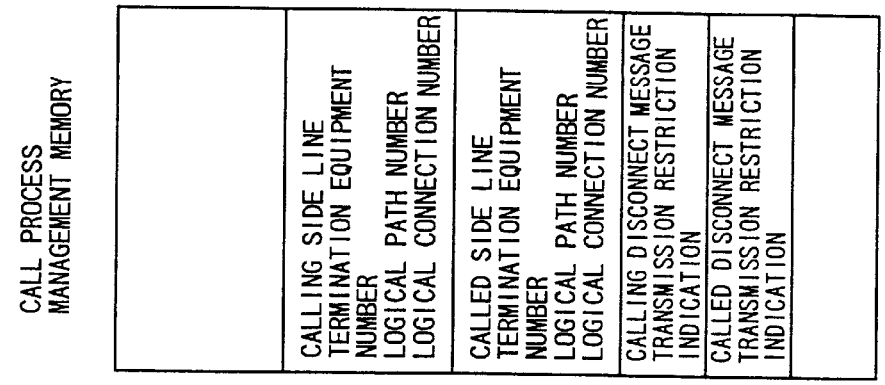
FIGS. 11A, 11B, 11C and 11D are diagrams of tables used in the embodiment of the present invention.
Figure 11B:
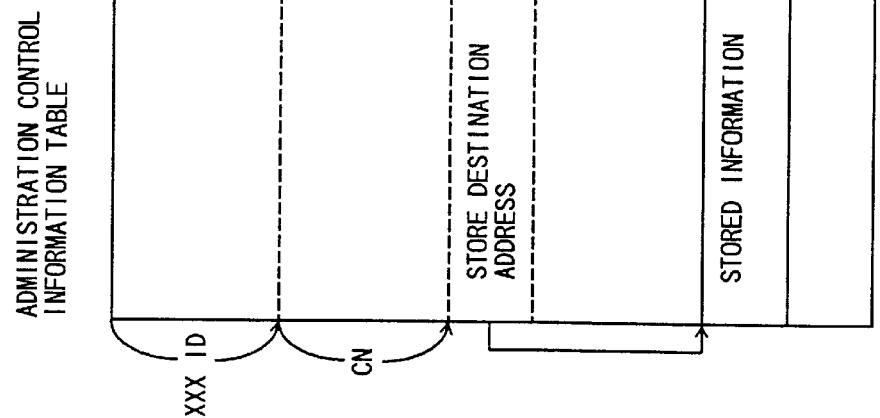
Figure 11C:
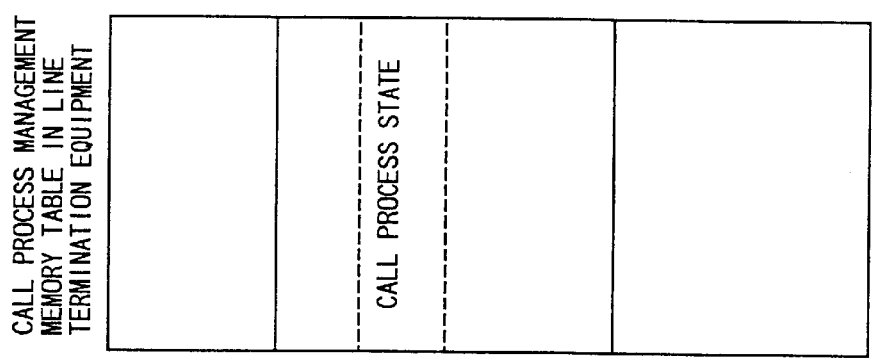
Figure 11D:
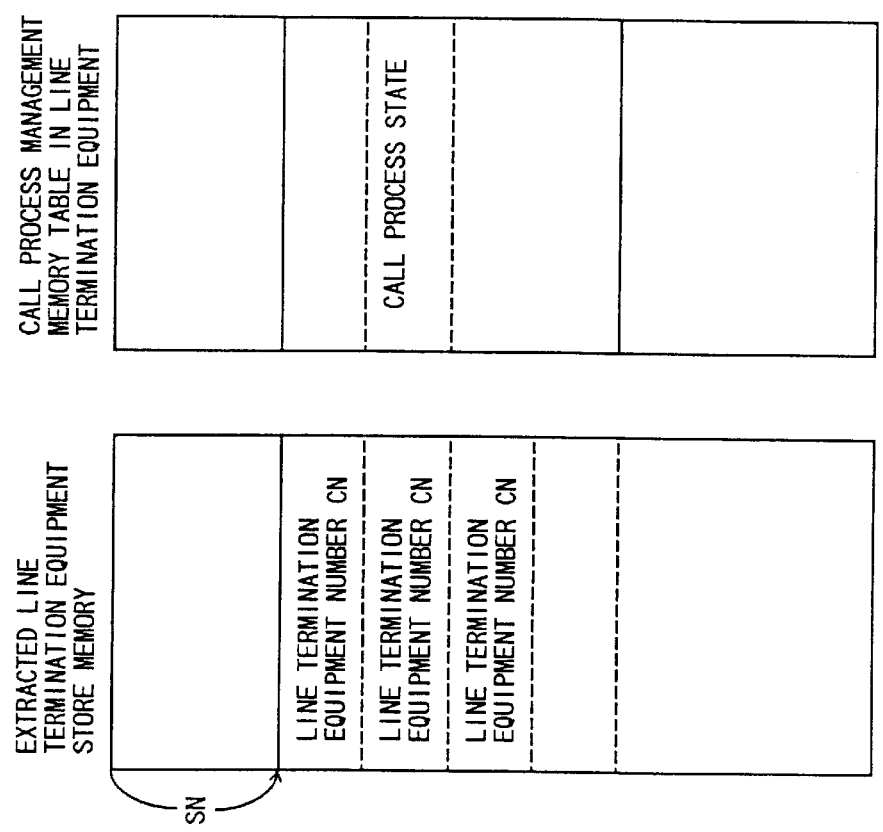

The enquiry controller searches the call process management table shown in FIG. 11B in the line termination equipment by using the above line termination equipment number CN stored in the work memory from the beginning thereof, and serially obtains the call process states in all of the accommodated management memories. Then, the enquiry controller determines, based on the information indicative of the control type in the subscriber data table, whether the call process states thus obtained request the enquiry control. For example, it is determined that the enquiry control is requested in the switch device initiative control or the dual control. In the case where the enquiry is requested, the enquiry controller activates the layer-3 communication controller 6 in the present example. If the enquiry is not requested, the enquiry controller does not activate the layer-3 communication controller 6. The above process is repeatedly carried out until all items in the call process management memory are retrieved.

The layer-3 communication controller 6 is activated by the enquiry controller, and sends an enquiry message to the user terminal. Then, the user terminal sends a response message to the enquiry controller. The above response message includes information concerning the state of the call of the subscriber, to which information the signaling link and the port number PN thereof are added.

The layer-3 communication controller 6 compares the received state of the call process state described in the call process management table in the line termination equipment. If the states do not coincide with each other, an inconsistency between the call states will occur. Thus, the layer-3 communication controller 6 sends the call release message to the user terminal. Thus, the call of the user terminal is released, and the call states between the subscriber and the switch device coincide with each other. If the call states coincide with each other, the layer-3 communication controller 6 does not perform the call release process for the user terminal.

FIG. 24 shows a sequence of the enquiry control in which the enquiry controller sends the enquiry to the subscriber terminal by itself. If a link reset/interlink fault in the signaling link is detected, or if the signaling controller 4 restarts, the enquiry controller stores the line termination equipment number CN relating to the detection/restart in the work memory in the same manner as described above.

Next, the enquiry controller searches the call process management table in the line termination equipment by referring to the line termination equipment number CN stored in the work memory, and serially obtains the call process states in all the management memories. Then, the enquiry controller determines whether the call process states request the enquiry control by using the information concerning the control type. In the case where the enquiry control is requested, the enquiry controller sends the enquiry message to the user terminal via the restart control sequence control interface controller. In response to the enquiry message, a response message is returned by the user terminal. The response message includes information concerning the state of the call of the subscriber, to which information the signaling controller number SN and the port number PN thereof are added.

The enquiry controller compares the state of the received call of the subscriber with the call process state in the call process management table in the line termination equipment, and requests the layer-3 communication controller 6 to release the call if the call states do not coincide with each other. If the call states coincide with each other, the enquiry controller does not request the layer-3 communication controller 6 to release the call. If the above determination shows the enquiry control is not requested, the enquiry controller requests the layer-3 communication controller to release the call. Thus, the call state of the user terminal and that of the switch device coincide with each other. The above process is repeatedly carried out until all the items in the call process management table are retrieved.

Figure 25:
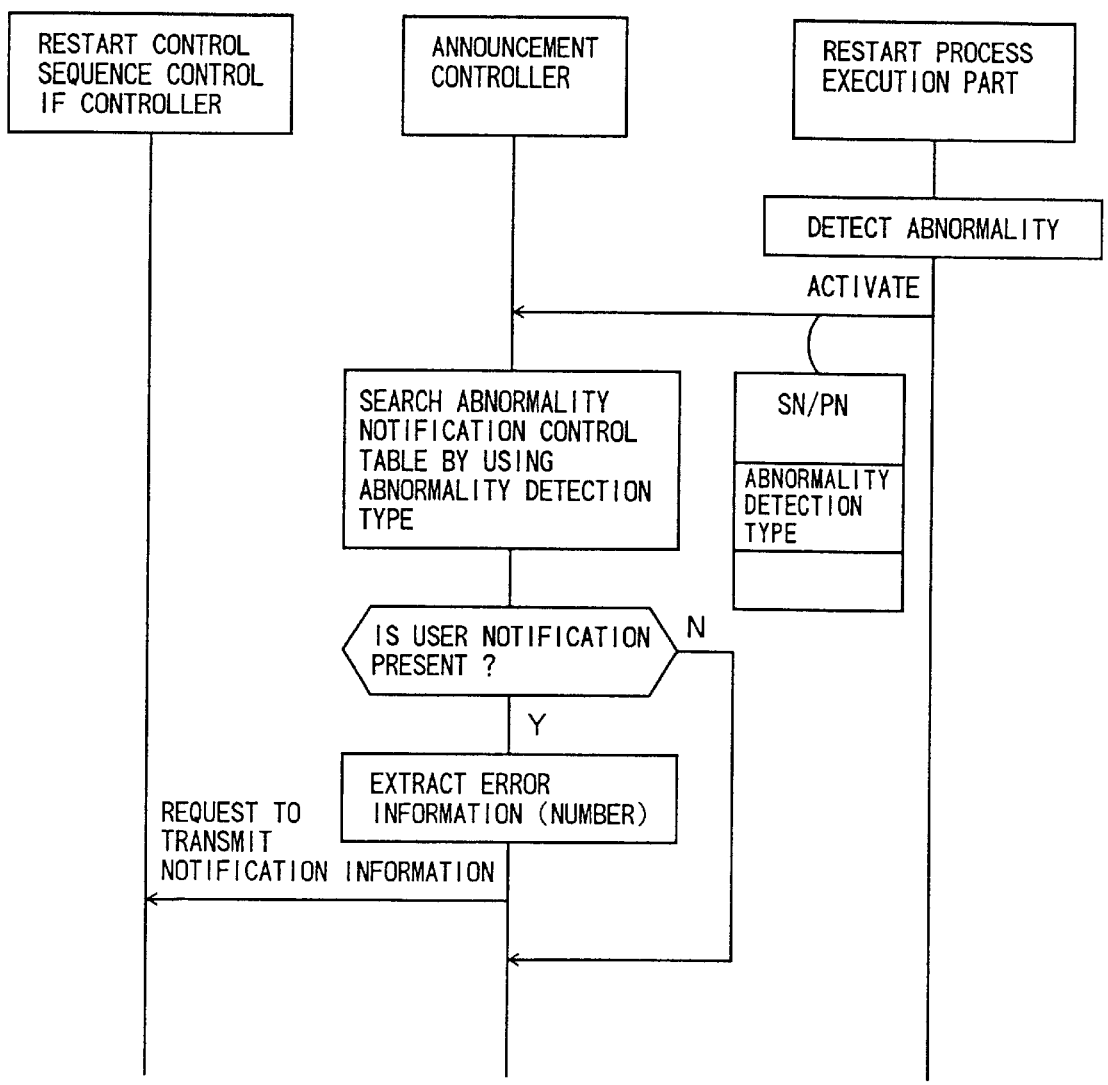
FIG. 25 is a diagram of a sequence of an announcement control.

FIG. 25 is a diagram showing an announcement control. When the restart process execution part 15 receives the restart request from the user terminal, the restart process execution part 15 determines whether the process can continue if the part 15 fails to acquire a control memory or detects a process inconsistency. If the process cannot continue, the restart process execution part 15 interrupts the process, and sends an activation signal to the announcement controller, the activation signal indicating the above determination result. The above activation signal includes the signaling controller number SN, the port number PN thereof and information concerning an abnormality detection type.

The announcement controller searches the abnormality notification control table shown in FIG. 10A by referring to the abnormality detection type information, and determines whether the user terminal should be notified in accordance with the control information indicating whether the user should be notified. In the case where the notification to the user is requested, the announcement controller reads an error number in the abnormality notification control table, and notifies the user terminal of error information via the restart control sequence control interface controller. In the case where the notification to the user is not requested, the above notification process is not performed.

Figure 26:
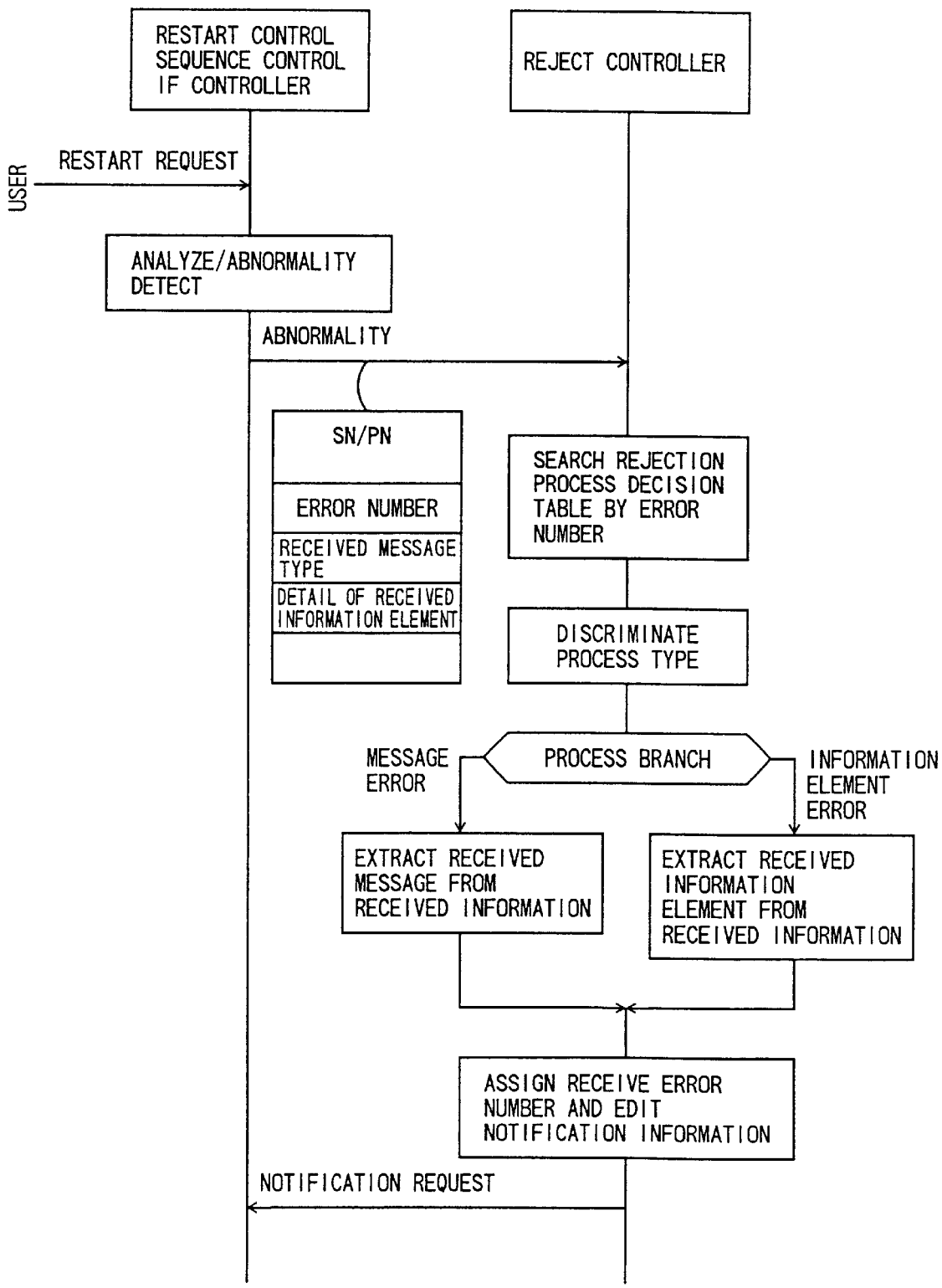
FIG. 26 is a diagram of a sequence of a reject control.

FIG. 26 shows a reject control. When the restart control sequence control interface controller receives the restart request from the user terminal, it checks the format of the received message. If the controller receives a departure (abnormality) other than the format error, it generates an abnormality signal, which is transferred to the reject controller. The abnormality signal includes the signaling controller number SN, the port number PN thereof, the error number, the received message type, and information indicative of the detail of a received information element.

The reject controller searches the rejection process decision table shown in FIG. 10B by using the received error number, and decides the process type from the process type information thus obtained. Then, the reject controller conditionally executes processes which branch in accordance with the result of the decision to the process type. That is, if the process type indicates a message error, the reject controller extracts the received message from the received information. If the process type indicates an information element error, the reject controller extracts the received information element from the received information. Then, the reject controller edits response information based on the content of the abnormality, and adds the received error number thereto. Then, the reject controller notifies the user terminal of the response via the restart control sequence control interface controller. In this case, the restart request from the user terminal is discarded.

Figure 27:
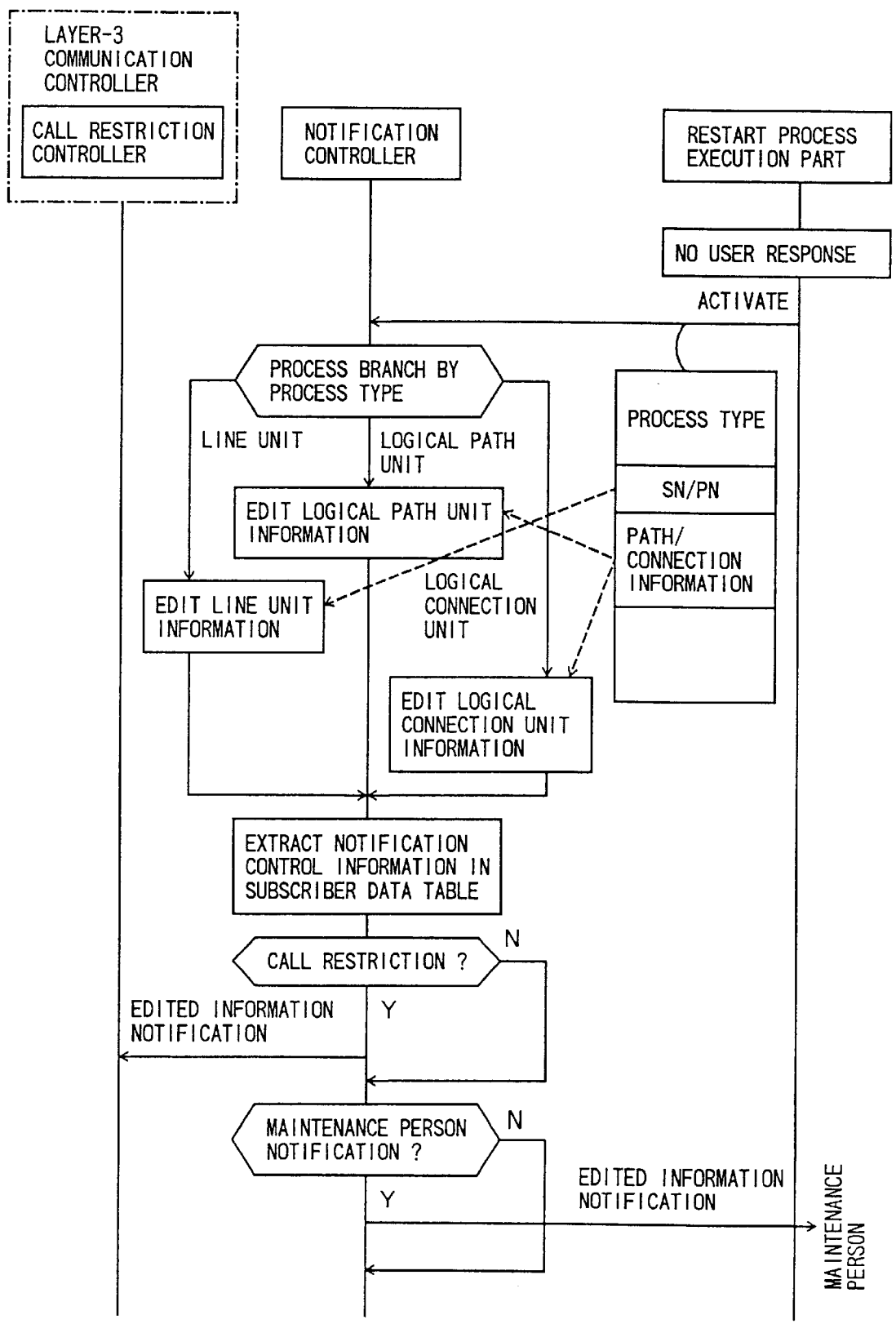
FIG. 27 is a diagram of a sequence of a notification control.

FIG. 27 is a diagram of a notification control. There is a case where the user terminal issues no response if the user terminal does not have the restart device (function), or a fault occurs in the restart device, even if the restart process execution part 15 sends the restart request to the user terminal. In such a case, the restart process execution part 15 generates an activation signal indicative of the above, and transfers it to a notification controller. The above activation signal includes the process type, the signaling controller number PN, the port number PN thereof and path/connection information.

The notification controller conditionally executes processes which branch on the basis of the information concerning the process type included in the received information. If the process type indicates the line (physical link) unit, the notification controller collects information (SN, PN) relating to the line unit from the received information. If the process type indicates the logical path unit, the notification controller collects information (path information) relating to the logical path unit from the received information. If the process type indicates the logical connection unit, the notification controller collects information (connection information) relating to the logical connection unit from the received information.

Next, the notification controller reads notification control information (showing whether a notification is requested) from the subscriber data table, and determines whether a call restriction notification should be sent. If the call restriction notification should be sent, the notification controller sends the above collected information to the call restriction controller provided in the layer-3 communication controller 6 in order to stop the call process for the user device which does not respond. The above call restriction controller will be described later. If the call restriction notification is not requested, the call restriction controller is not notified.

Next, the notification controller reads information concerning a maintenance terminal which should be notified by referring to the subscriber data table. If the above information is available, the notification controller sends the collected information to the maintenance terminal. This is done via, for example, the upper-layer controller 8. If the information concerning the maintenance terminal which should be notified is not available, the notification controller does not notify the maintenance terminal.

Figure 28:
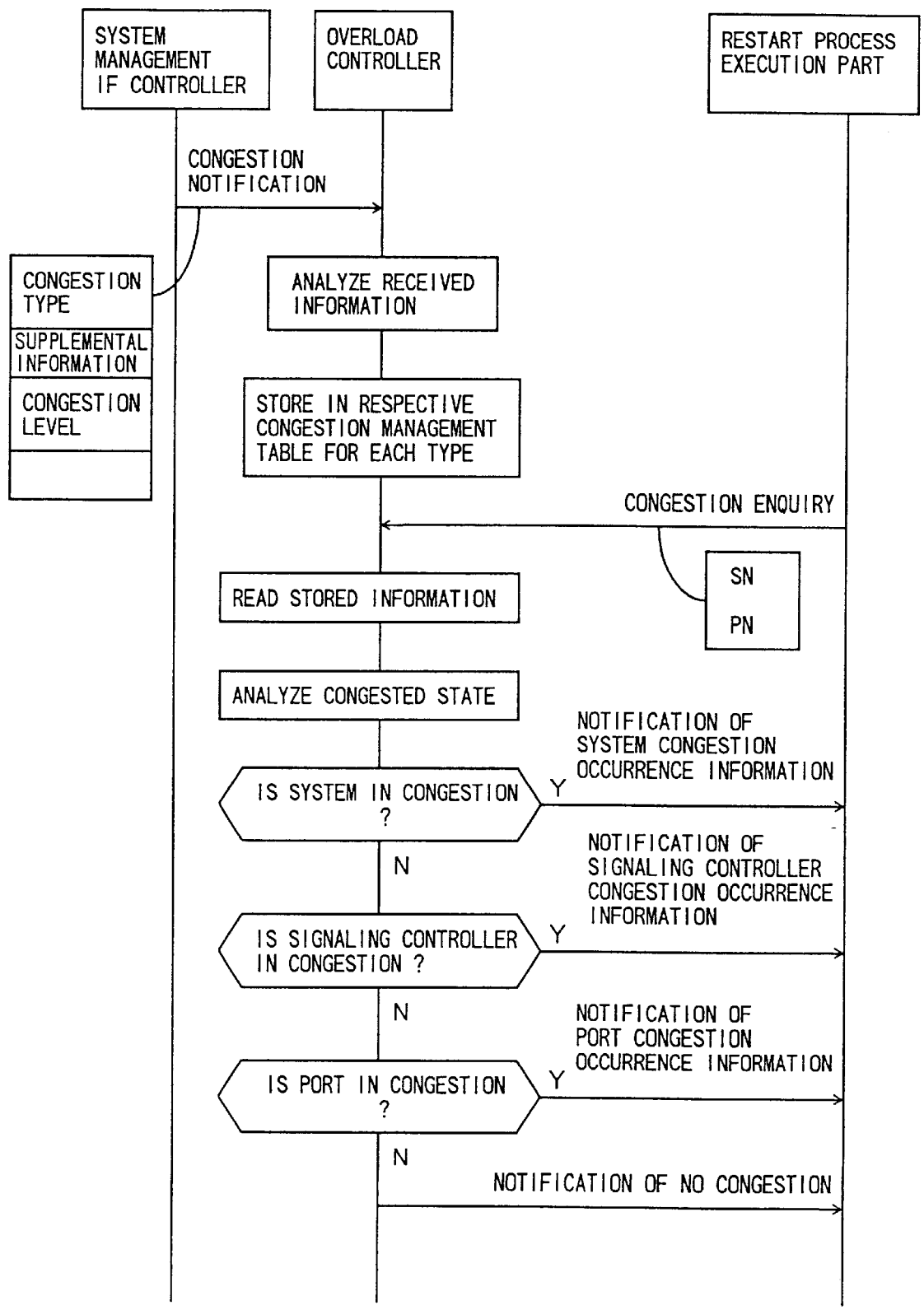
FIG. 28 is a diagram of a sequence of an overload control.

FIG. 28 is a diagram showing an overload control. When the system management interface controller receives, from the switch device system controller 10, a notification indicative of occurrence of a congestion of the switch device, it generates a congestion notification, which is transferred to the overload controller. The congestion notification includes a congestion type, supplemental information and information indicative of a congestion level (degree of congestion).

The overload controller analyzes the received information, and refers to the congestion information management table shown in FIG. 10C by using the congestion type. Then, the overload controller stores the received supplemental information and the congestion level information in a respective storage area for each congestion type.

If the overload controller is asked by the restart process execution part 15 as to whether there is a congestion, the overload controller reads the information stored in the congestion information management table, and analyzes the congestion state for each congestion type. If the system becomes congested, the overload controller sends the information concerning the occurrence of the system congestion back to the restart process execution part 15. If the signaling controller becomes congested, the overload controller sends the information concerning the occurrence of a congestion in the signal controller back to the restart process execution part 15. If the port falls in a congestion, the overload controller sends the information concerning the occurrence of a congestion in the port back to the restart process execution part 15. If no congestion information is stored, the overload controller sends information indicative of no congestion back to the restart process execution part 15.

Figure 29:
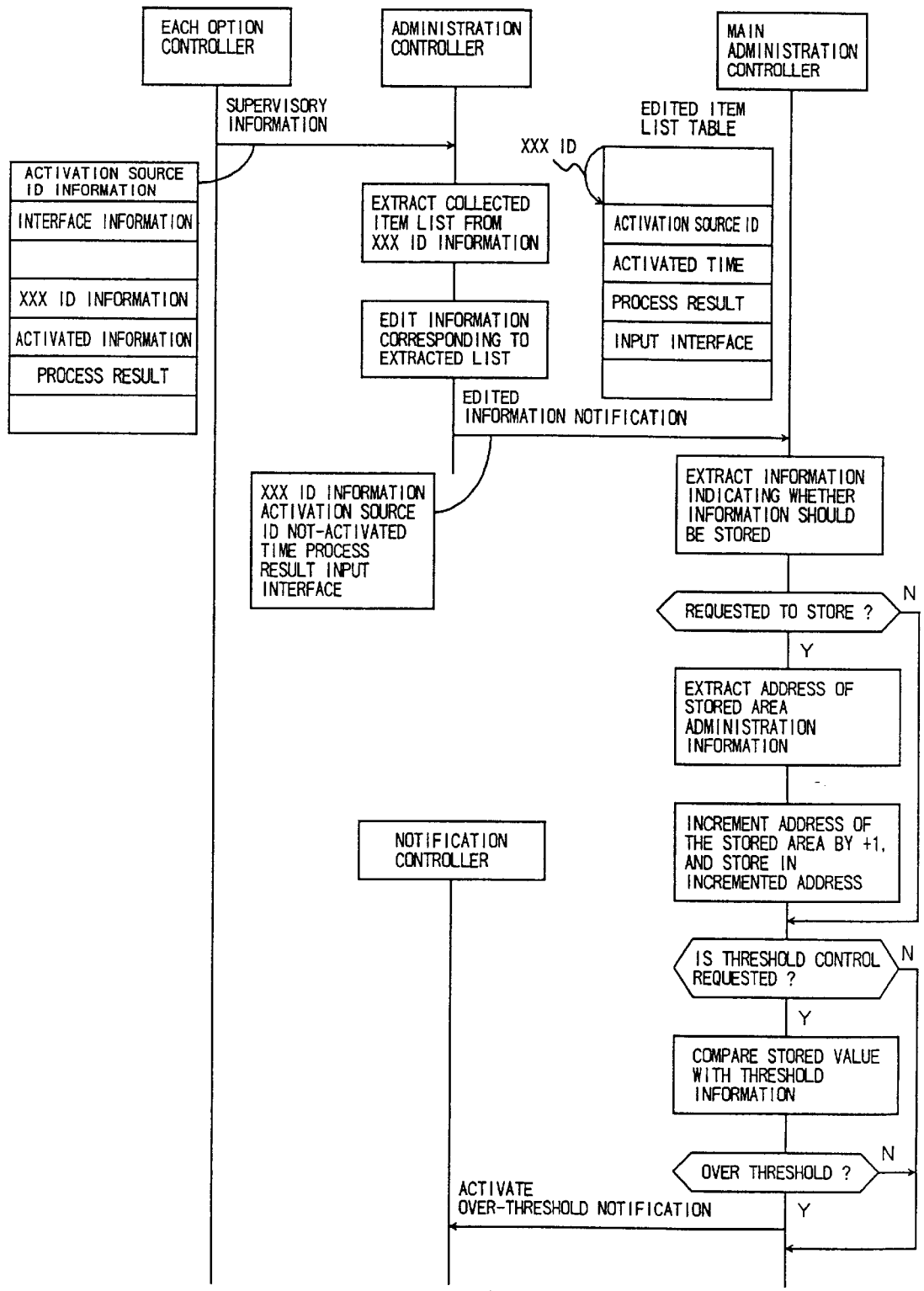
FIG. 29 is a diagram of a sequence of an administration control.

FIG. 29 is a diagram showing information administration control. The supervisory information sent from the option devices includes activation source ID information, interface information, XXX ID information, activated device information (which is the same as the above interface information), and process result information. The activation source ID information relates to an activation source device which activates the corresponding option device. The interface information shows the detail of the activation source device. The XXX ID information relates to an XXX option controller which performs the option control in response to the activation. The activated controller information relates to the XXX option controller. The process result information relates to the result of execution of the option control.

When the administration controller receives supervisory information, it refers to an edited item list table by using the XXX ID information, and extracts a list of items which are edited. Next, the administration controller extracts information corresponding to the list of extracted items from the supervisory information, and edits the extracted information. The edited information includes the XXX ID information, the activation source ID information, activated time information (time stamp information), process result information, and input interface information (SP, PN). Then, the administration controller sends the edited information to a main administration controller.

The main administration controller extracts, based on the input interface information in the received information, control information indicating whether the storing of information in the subscriber data table is requested. Then, the main administration controller determines whether the storing of information is requested on the basis of the control information. If the storing of information is requested, the main administration controller extracts, from the administration control information table shown in FIG. 11, an address of a storage area in which the administration information (storage information) should be stored by referring to the XXX ID information and the line termination equipment number CN obtained via the input interface. Then, the main administration controller adds +1 to the content of the stored information read from the table, and restores the result in the same area as that in which the stored information read is stored. If the storing of information is not requested, the main administration controller does not update the stored information.

Then, the main administration controller reads control information indicating whether a threshold control is requested from the subscriber data table, and determines whether the threshold control should be carried out. If the threshold control should be executed, the main administration controller compares the value of the stored address with a threshold stored in the subscriber data table. When the stored value is greater than the threshold value, the main administration controller notifies the notification controller that the stored value exceeds the threshold value. This notification is transferred to the maintenance person. If the threshold control is not requested or if the stored value is equal to or less than the threshold value, the main administration controller does not send a notification to the notification controller.

Figure 30:
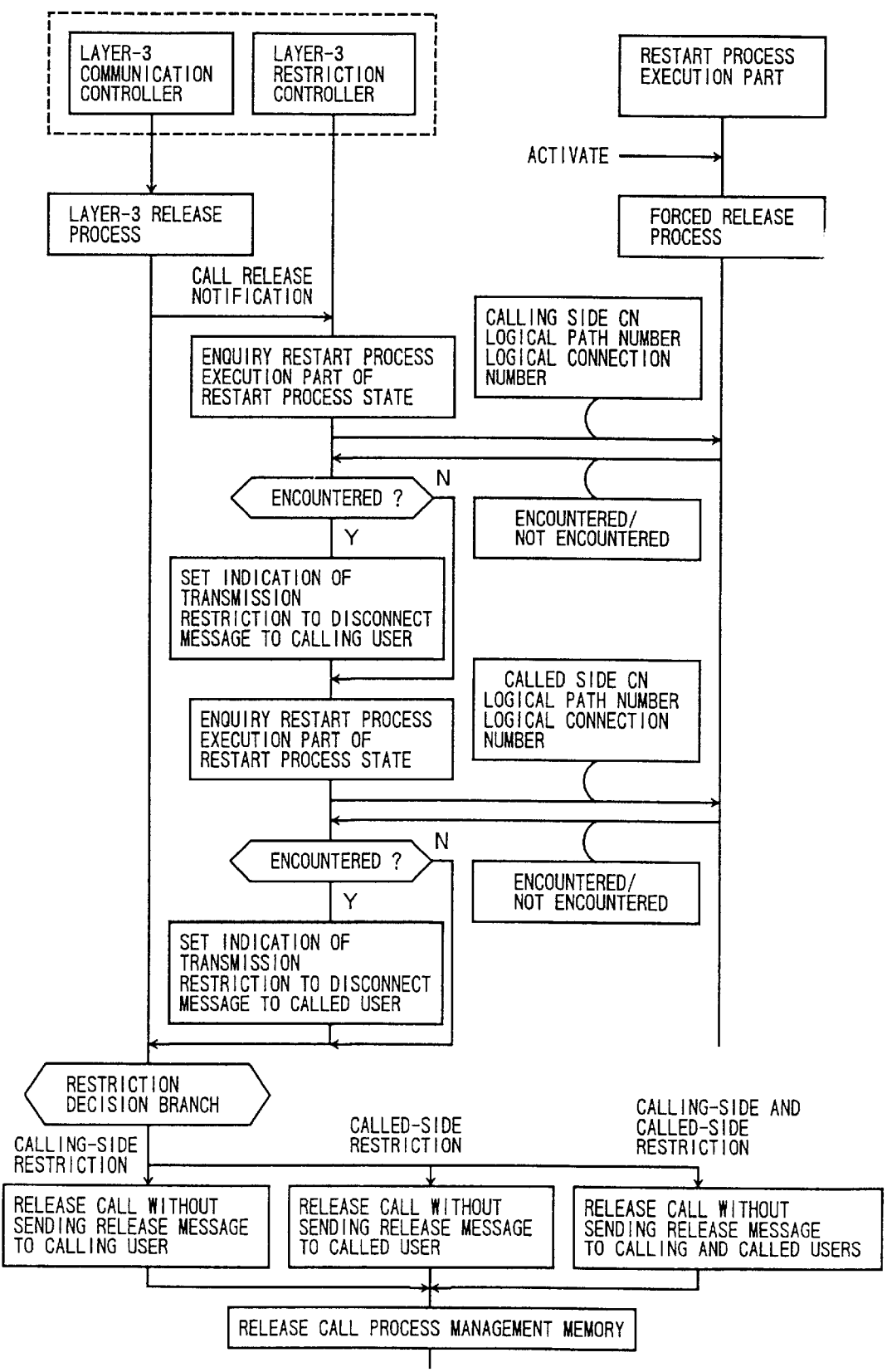
FIG. 30 is a diagram of a sequence of a layer-3 restriction control.

FIG. 30 is a diagram of a layer-3 restriction control. The restart process execution part 15 performs a forced release process for a user terminal in response to a command from the maintenance person or the like. The layer-3 communication controller 6 notifies the layer-3 restriction controller of a call release before the layer-3 release process.

The layer-3 restriction controller receives the above notification, and enquires of the restart process execution part 15 the restart process state on the basis of information concerning the calling source described in the call process management table shown in FIG. 11. The above enquiry includes the calling source side line termination equipment number CN, the logical path number and the logical connection number. The restart process execution part 15 sends information indicating whether the restart process of the calling source side connection encounters a fault.

The layer-3 restriction controller determines, based on the received information, whether the restart process encounters a fault. If the result is affirmative, the layer-3 restriction controller sets a call disconnect message transmission restricting indication to the calling user described in the call process management table. If the restart process encounters a fault, the layer-3 restriction controller skips the above process.

Then, the layer-3 restriction controller enquires of the restart process execution part 15 the restart process state on the basis of called-side information described in the call process management table. The above enquiry includes a called side line termination equipment number CN in the call process management table, the logical path number and the logical connection number. The restart process execution part 15 sends information indicating whether the restart process of the called-side connection encounters a fault, back to the layer-3 restriction controller.

The layer-3 restriction controller determines whether the restart process encounters a fault by referring to the received information. If the restart process encounters a fault, the layer-3 restriction controller sets the call disconnect message transmission restricting indication to the called user described in the call process management memory. If the restart process encounters a fault, the layer-3 restriction controller skips the above process.

When the enquiry process of the restart process state is completed, the process is returned to the layer-3 communication controller 6. The layer-3 communication controller decides the setting of the transmission restricting indication set in the call process management table, and conditionally performs process which branch in accordance with the decision result. If the calling side transmission is restricted, the layer-3 communication controller releases the call without sending the release message to the calling user terminal. If the called side transmission is restricted, the layer-3 communication controller releases the call without sending the release message to the called user terminal. If both the calling side transmission and the called side transmission are restricted, the layer-3 communication controller releases the call without sending the release message to the calling and called user terminals.

Figure 31:
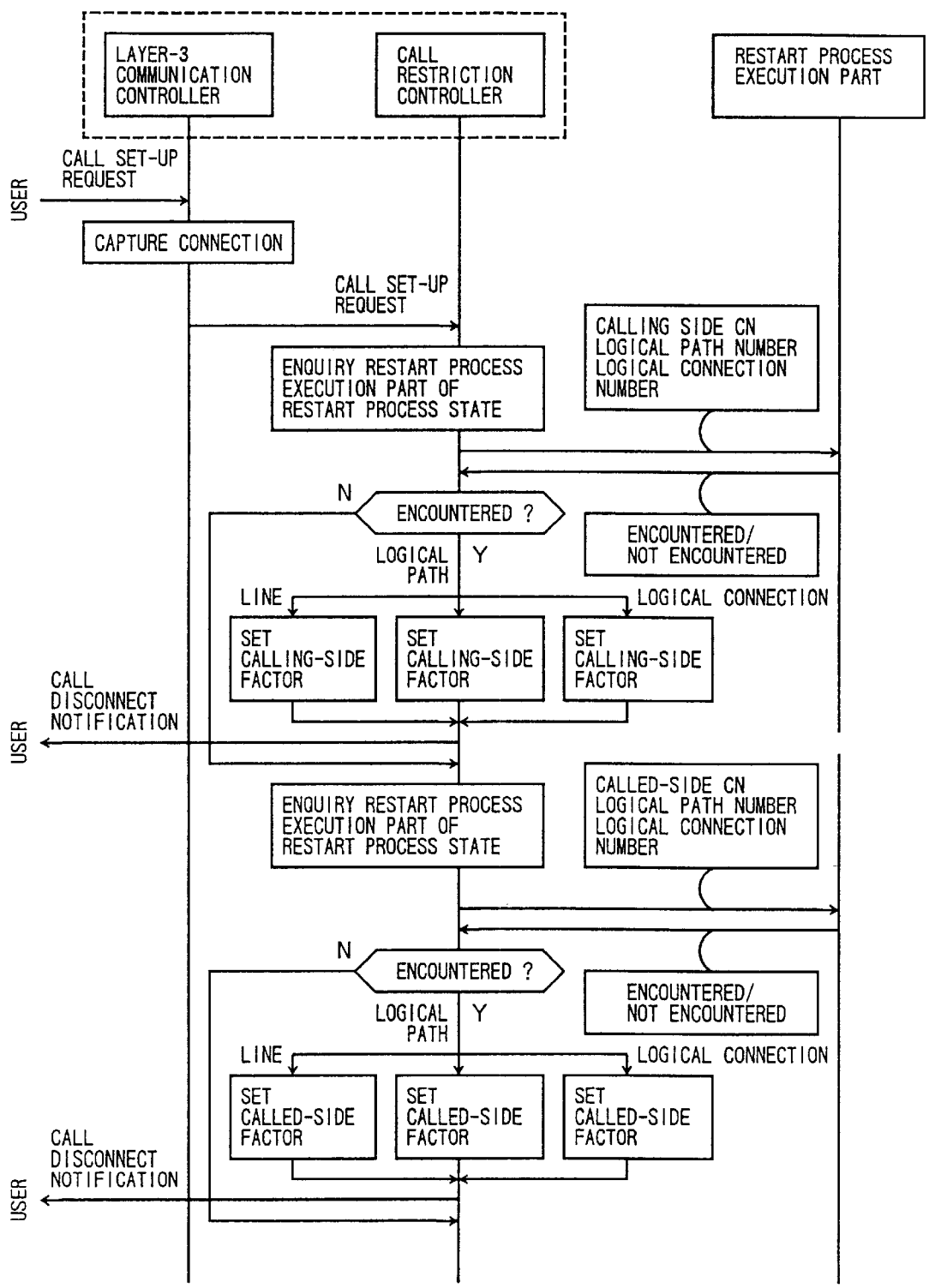
FIG. 31 is a diagram of a sequence of a call restriction control.

FIG. 31 is a diagram showing a call restriction control. The layer-3 communication controller 7 receives a call set up request from the user terminal, captures an idle connection, and notifies the call restriction controller of the setting up of a call. The call restriction controller enquires of the restart process execution part 15 the restart process state on the basis of the calling-side information in the call process management table. The above enquiry includes the calling-side line termination equipment number CN in the call process memory, the logical path number and the logical connection number.

The restart process execution part 15 narrows down the received information relating to the line, path and connection in this order. Then, the part 15 extracts the coincident restart process, and sends back the call restriction controller information concerning the restart process encounter and encounter type.

The call restriction controller determines whether the restart process encounters a fault based on the received information, and conditionally performs processes which branch in accordance with the determination results. If the encounter type relates the line unit, the call restriction controller sets a calling-side factor on the line unit basis. If the encounter type relates to the logical path unit, the call restriction controller sets a calling-side factor on the logical path basis. If the encounter type relates to the logical connection unit, the call restriction controller sets a calling-side factor on the logical connection basis. If there is no encounter, the call restriction controller does not send the call disconnect notification to the calling user terminal.

Then, the call restriction controller enquires of the restart process execution part 15 the restart process state by referring to the called-side information described in the call process management memory. The above enquiry includes the called-side line termination equipment number CN in the call process management table, the logical path number and the logical connection number. The restart process execution part 15 sends the information concerning the restart process encounter and encounter type back to the call restriction controller.

The call restriction controller determines whether the restart process encounters a fault on the basis of the received information. If it is determined that the restart process encounters a fault, the call restriction controller conditionally performs processes which branch in accordance with the encounter type. If the encounter type relates to the line unit, the call restriction controller sets a called-side factor on the line unit basis. If the encounter type relates to the logical path unit, the call restriction controller sets a called-side factor on the logical path unit. If the encounter type relates to the logical path unit, the call restriction controller sets a called-side factor on the logical connection unit. Then, the call restriction controller notifies the called user terminal that the call is disconnected. If there is not encounter, the call restriction controller does not send a notification to the called user terminal. Thereafter, the process is returned to the layer-3 communication controller 6, which performs a normal post-process.

The above description relates to an application to the ATM switch device. However, the present invention is not limited to the above. For example, in a switch device which performs a frame relay of packets on demand, the SVC can be realized in the same call control phase (layer-3 commu- nication protocol) as that of the ATM and the same data transfer phase as that of the ATM except that the above switch device stores variable-length packets. That is, the present invention includes a frame relay switch device of packets.

The present invention is not limited to the specifically described embodiments, and variations and modifications may be made without departing from the scope of the present invention.

What is claimed is:

1. A switch device in a communication
   a communication controller which performs a signaling control of respective signaling messages including a cell set-up and a call release requested by a terminal handling a fixed length cell in accordance with communication protocol; and
   a restart controller which performs a call release process for a call using a virtual path and a virtual channel managed by the communication controller in accordance with a restart request for a new call,
   wherein the communication restart controller includes a connection analysis controller interposed between the user terminal and the switch device; and
   when the connection analysis controller receives the restart request from the user terminal, the connection analysis controller determines whether information concerning a connection included in the restart request indicates an intolerable connection, and accepts the restart request if a determination result is negative, and
   wherein the connection analysis controller selectively makes a first decision to a permanent virtual circuit, a second decision to a signaling ink, and/or a third decision to the permanent virtual circuit and the signaling link.

2. A switch device in a communication system comprising:
   a communication controller which performs a signaling control of respective signaling messages including a call set-up and a call release requested by a terminal handling a fixed length cell in accordance with communication protocol; and
   a restart controller which performs a call release process for a call using a virtual path and a virtual channel managed by the communication controller in accordance with a restart request for a new call,
   wherein:
      the communication restart controller includes a protection controller interposed between the user terminal and the switch device, and a process state management controller which holds user notification restart process management information used to manage the restart process executed by the switch device and directed to the user terminal in response to the restart request from the user terminal; and
      when the protection controller receives the restart request from a user terminal, the protection controller determines whether the restart process is being executed in response to another restart request from the user terminal by searching the user notification restart process management information in the process state management part, and accepts the restart request if a determination result is negative.

3. A switch device in a communication system comprising:
   a communication controller which performs a signaling control of respective signaling messages including a call set-up and a call release requested by a terminal handling a fixed length cell in accordance with communication protocol; and a restart controller which performs a call release process for a cell using a virtual path and a virtual channel managed by the communication controller in accordance with a restart request for a new call, wherein:

the communication restart controller includes a protection controller interposed between the user terminal and the switch device, and a process state management part which holds user notification restart process management information used to manage a restart process executed by the switch device and directed to the user terminal in response to the restart request from the user terminal; and when the protection controller receives the restart request from one of the controllers in the switch device, the protection controller determines whether the user terminal is executing the restart process by searching the switch device notification restart management information in the process state management part, and accepts a restart process if a determination result is negative.

4. The switch device as claimed in claim 4, wherein when the determination result is affirmative, the protection controller discards the restart request, holds and executes all restart requests in a requesting order, or executes a restart request which is held for the last time after the restart process being executed is completed.

5. The switch device as claimed in claim 4, wherein an operation of the protection controller to be executed when the determination result is affirmative can be selected by the user terminal.

6. A switch device in a communication system comprising:

a communication controller which performs a signaling control of respective signaling messages including a call set-up and a call release requested by a terminal handling a fixed length cell in accordance with communication protocol; and a restart controller which performs a signaling control of respective signaling messages including a call set-up and a call release requested by a terminal handling a fixed length cell in accordance with communication protocol; and the communication restart controller includes a protection controller interposed between the user terminal and the switch device, and a process state management controller which holds user notification restart process management information used to manage the restart process executed by the switch device and directed to the user terminal in response to the restart request from the user terminal; and when the protection controller receives the restart request from a user terminal, the protection controller determine whether the restart process is being executed in response to another restart request from the user terminal by searching the user notification restart process management information in the process state management part, and accepts the restart request if a determination result is negative, wherein when a counter determination result is obtained, the response or the restart request is discarded and the user terminal is notified that the response or the restart request is discarded and that the response or the restart request has an error.

7. A switch device in a communication system comprising:

a communication controller which performs a signaling control of respective signaling messages including a call set-up and a call release requested by a terminal handling a fixed length cell in accordance with communication protocol; and a restart controller which performs a call release process for a call using a virtual path and a virtual channel managed by the communication controller in accordance with a restart request for a new call, wherein:

the communication restart controller includes a preservation controller connected to a system management control part which manages the control part in the switch device, a control memory management part which holds process state management information for managing a state transition of a restart process in the communication restart controller; and when the preservation controller receives a notification of a restart from the system management controller, the preservation controller extracts a call which is subjected to the restart process by the communication restart controller by searching the process state management part, and executes the restart process for the call if ensuring the restart process is requested.

8. A switch device in a communication system comprising:

a communication controller which performs a signaling control of respective signaling messages including a call set-up and a call release requested by a terminal handling a fixed length cell in accordance with communication protocol; and a restart controller which performs a call release process for a call using a virtual path and a virtual channel managed by the communication controller in accordance with a restart request for a new call, wherein the communication restart controller includes:

a preservation controller connected to a system management control part which manages controllers in the switch system;

a control memory management part which holds process state management information for managing a state transition of the restart process in the communication restart controller; and a process state management part which holds user notification restart process management information used to manage a restart process executed by the switch device and directed to the user terminal in response to the restart request from the user terminal, and wherein:

when the preservation controller receives a notification of a restart from the system management control part, the preservation controller extracts a call which is subjected to the restart process by the communication restart controller by searching the process state management part on the basis of the restart process management information of the process stage management part, and executes the restart process for the call if ensuring the restart process is requested.

9. The switch device as claimed in claim 7, wherein when the determination result is affirmative, the protection controller discards the restart request, holds and executes all restart requests in a requesting order, or executes a restart request which is held for the last time after the restart process being executed is completed.

10. A switch device in a communication system comprising:
- a communication controller which performs a signaling control of respective signaling messages including a call set-up and a call release requested by a terminal handling a fixed length cell in accordance with communication protocol; and
- a restart controller which performs a call release process for a call using a virtual path and a virtual channel managed by the communication controller in accordance with a restart request for a new call, wherein:
the communication restart controller includes an enquiry controller interposed between a lower layer controller and the switch device; and
if the enquiry controller detects a link reset/interlink fault in a signaling link, or if the enquiry controller receives a notification of a fault relating to the lower layer, the enquiry controller obtains a call process state of a call which encounters a fault from a call process management table managed by the communication controller, and enquires, by itself, of the user terminal a state of the call which encounters the fault in order to confirm whether the communication sequence is normally executed by the communication controller.

11. A switch device in a communication system comprising:
- a communication controller which performs a signaling control of respective signaling messages including a call set-up and a call release requested by a terminal handling a fixed length cell in accordance with communication protocol; and
- a restart controller which performs a call release process for a call using a virtual path and a virtual channel managed by the communication controller in accordance with a restart request for a new call, wherein:
the communication restart controller includes an enquiry controller interposed between a lower layer controller and the switch device; and
if the enquiry controller detects a link reset/interlink fault in a signaling link, or if the enquiry controller receives a notification of a fault relating to the lower layer, the enquiry controller obtains a call process state of a call which encounters a fault from a call process management table managed by the communication controller, and enquires, by itself, of the user terminal a state of the call which encounters the fault in order to confirm whether the communication sequence is normally executed by the communication controller.

12. A switch device in a communication system comprising:
- a communication controller which performs a signaling control of respective signaling messages including a call set-up and a call release requested by a terminal handling a fixed length cell in accordance with communication protocol; and
- a restart controller which performs a call release process for a call using a virtual path and a virtual channel managed by the communication controller in accordance with a restart request for a new call, wherein:
the communication restart controller includes an announcement controller interposed between a lower layer controller and the switch device; and
when the communication restart controller receives a restart request from the user terminal and detects a situation in which a resource necessary for the restart control cannot be obtained or a process inconsistency occurs in the communication restart controller, so that the restart process cannot continue, the announcement controller notifies the user terminal which issues the restart request that the restart process is stopped.

13. A switch device in a communication system comprising:
- a communication controller which performs a signaling control of respective signaling messages including a cell set-up and a call release requested by a terminal handling a fixed length cell in accordance with communication protocol; and
- a restart controller which performs a call release process for a call using a virtual path and a virtual channel managed by the communication controller in accordance with a restart request for a new call, wherein:
the communication restart controller includes a restart control sequence control interface controller which provides a communication restart control sequence interface with the user terminal, and a reject controller connected t the restart control sequence control interface controller;
when the restart control sequence control interface controller receives the restart request from the user terminal, the restart control sequence control interface controller checks a format of the received restart request, and provides the reject controller with an analysis result and necessary received information; and
the reject controller discards the restart request in response to receipt of the analysis result and the necessary received information, and edits given notification information based thereon, the given notification information being sent to the user terminal.

14. A switch device in a communication system comprising:
- a communication controller which performs a signaling control of respective signaling messages including a call set-up and a call requested by a terminal handling a fixed length cell in accordance with communication protocol; and
- a restart controller which performs a call release process for a call using a virtual path and a virtual channel managed by the communication controller in accordance with a restart request for a new call, wherein:
the communication restart controller includes a notification controller interposed between the communication restart controller and an upper-layer controller or the communication controller;
the notification controller is activated when there is not response from the user terminal in response to the restart request from the communication restart controller, and edits abnormality control on the basis of abnormality information concerning a line, a logical path or a logical connection via which no response is received; and
the notification controller notifies a maintenance person of the abnormality information, or notifies the communication controller of the abnormality information in order to urge a restriction of the call process to the user terminal.

15. The switch device as claimed in claim 14, wherein a range of the restriction of the call process by the layer-3 communication controller is selectable beforehand by the user terminal.

16. The switch device as claimed in claim 14, wherein the layer-3 communication controller releases the restriction of the call process when the user terminal which restricts the call process activates the layer-3 communication controller.

17. The switch device as claimed in claim 16, wherein the connection which subjected to the call process is recovered when the user terminal specifies the above connection and activates the layer-3 communication controller.

18. A switch device in a communication system comprising:
   a communication controller which performs a signaling control of respective signaling messages including a call set-up and a call release requested by a terminal handling a fixed length cell in accordance with communication protocol; and
   a restart controller which performs a call release process for a call using a virtual path and a virtual channel managed by the communication controller in accordance with a restart request for a new call,
   wherein:
      the communication restart controller includes an overload controller connected to a system management controller which manages controllers of the switch device;
      when the overload controller receives, from the system management control part, a notification of a congestion which occurs in the switch device, the overload controller analyzes a content of the notification and manages an analyzed result for each congestion type; and
      the overload controller provides congestion management information in response to an enquiry from the communication restart controller.

19. A switch device in a communication system comprising:
   a communication controller which performs a signaling control of respective signaling messages including a call set-up and a call release requested by a terminal handling a fixed length cell in accordance with communication protocol; and
   a restart controller which performs a call release process for a call using a virtual path and a virtual channel managed by the communication controller in accordance with a restart request for a new call,
   wherein:
      the communication restart controller includes an upper-layer interface controller connected to an upper-layer controller; and
      a communication restart controller executes the restart process in a switch initiative formation in response to a command that is input via the upper-layer interface controller.

20. A switch device in a communication system comprising:
   a communication controller which performs a signaling control of respective signaling messages including a call set-up and a call release requested by a terminal handling a fixed length cell in accordance with communication protocol; and
   a restart controller which performs a call release process for a call using a virtual path and a virtual channel managed by the communication controller in accordance with a restart request for a new call,
   wherein:
      the communication restart controller includes an upper-layer interface controller connected to the communication controller; and
      when there is no release response from the user terminal by a call release request by the communication controller, the communication restart controller is informed that there is no release response and executes a restart process in a switch initiative formation.

21. A switch device in a communication system comprising:
   a communication controller which performs a signaling control of respective signaling messages including a call set-up and a call release requested by a terminal handling a fixed length cell in accordance with communication protocol; and
   a restart controller which performs a call release process for a call using a virtual path and a virtual channel managed by the communication controller in accordance with a restart request for a new call,
      administration controllers that are respectively provided to the controllers of the switch device and supervise operating states of the controllers; and
      a main administration controller which totally manages the administration controllers;
      wherein the main administration controller collects supervisory information from the controllers and issue an indication when the supervisory information satisfies a given condition.

* * * * *